United States Patent [19]
Kato et al.

[11] Patent Number: 5,993,338
[45] Date of Patent: Nov. 30, 1999

[54] APPARATUS FOR CONTROLLING DYNAMIC SYSTEM IN SLIDING MODE AND FEEDFORWARD CONTROL

[75] Inventors: Yoshifumi Kato, Aichi-ken; Noboru Miyamoto, Kariya; Masanori Sugiura, Chiryu; Masami Fujitsuna, Kariya, all of Japan

[73] Assignee: Denso Corporation, Kariya, Japan

[21] Appl. No.: 09/031,530

[22] Filed: Feb. 27, 1998

[30]     Foreign Application Priority Data

| Feb. 27, 1997 | [JP] | Japan | 9-044065 |
| Nov. 4, 1997  | [JP] | Japan | 9-301858 |
| Dec. 22, 1997 | [JP] | Japan | 9-353528 |

[51] Int. Cl.$^6$ .......................... F16H 59/00; F16H 61/00; B60K 41/12; G05B 19/416
[52] U.S. Cl. ................. 474/12; 474/18; 474/28; 477/45; 477/49; 318/568.18
[58] Field of Search ................. 474/12, 11, 8, 474/18, 28; 477/44, 45, 46, 47, 48, 49, 50; 318/568.1, 568.13, 568.14, 568.15, 568.16, 568.17, 568.18, 568.19, 568.22, 568.23, 568.24, 568.25

[56]               References Cited

U.S. PATENT DOCUMENTS

| 4,579,021 | 4/1986 | Yamamuro et al. | 477/45 |
| 4,597,308 | 7/1986 | Tanaka et al. | 474/18 |
| 4,702,128 | 10/1987 | Oshiage | 474/28 |
| 4,708,031 | 11/1987 | Morimoto et al. | 477/49 |
| 5,042,326 | 8/1991 | Hibi et al. | 74/866 |
| 5,099,719 | 3/1992 | Hibi et al. | 74/866 |
| 5,216,342 | 6/1993 | Torii et al. | 318/568.1 |

FOREIGN PATENT DOCUMENTS

| 61-271509 | 12/1986 | Japan . |
| 61-271510 | 12/1986 | Japan . |
| 7-167234  | 7/1995  | Japan . |
| 63-043837 | 4/1996  | Japan . |
| 8-249067  | 9/1996  | Japan . |

OTHER PUBLICATIONS

Slotine et al: "Sliding Control", Applied Nonlinear Control, 1991, pp. 276–309.
Harashima et al: "Sliding Mode Control", Computer and Applicants Mook Computrol; Jan. 30, 1986, pp. 72–78 (w/partial English translation).

Primary Examiner—Thomas R. Hannon
Assistant Examiner—Matthew A. Kaness
Attorney, Agent, or Firm—Pillsbury Madison & Sutro LLP

[57]               ABSTRACT

An apparatus for controlling a dynamic system, for example, a continuously variable transmission for an automotive vehicle which adjusts a gear ratio by bringing a pulley position of a primary pulley into agreement with a target one through a hydraulic system under the feedforward and sliding mode control is provided. The apparatus calculates a feedforward-controlled variable in addition to a feedback-controlled variable and adjusts the pulley position of the primary pulley to a target one using the hydraulic pressure provided based on the sum of the feedforward-controlled variable and the feedback-controlled variable, thereby enhancing the robustness of the sliding mode control without causing the hunting.

33 Claims, 23 Drawing Sheets

OPERATING POINT 1 : F/F TERM ERROR IS SMALL
OPERATING POINT 2 : F/F TERM ERROR IS GREAT

APPARATUS FOR CONTROLLING DYNAMIC SYSTEM IN SLIDING MODE AND FEEDFORWARD CONTROL

BACKGROUND OF THE INVENTION

1. Technical Field of the Invention

The present invention relates generally to an apparatus designed to control a dynamic system such as a continuously variable transmission for automotive vehicles under the sliding mode and feedforward control.

2. Background of Related Art

In recent years, belt-driven continuously variable transmissions are used in automotive vehicles. This type of transmissions are usually controlled to achieve a gear ratio corresponding to an operating condition of the vehicle by changing parameters such as the position of a driving pulley and the primary speed (i.e., the speed of the driving pulley).

For adjustment of the gear ratio, the belt-driven continuously variable transmission includes a secondary hydraulic system which is responsive to an input torque to develop a secondary hydraulic pressure for adjustment of belt-holding force of a driven pulley and a gear ratio control system which is responsive to the input torque and the secondary hydraulic pressure to develop a primary hydraulic pressure required for adjustment of the driving pulley to change the gear ratio. To establish a desired gear ratio, the gear ratio control system calculates a target pulley position and a target primary speed to determine differences or shifts of actual pulley position and primary speed from the targets and calculates a target primary hydraulic pressure under feedback control based on the determined shifts.

In the feedback control, adjustment of a control gain or correction of a target controlled parameter is performed according to several operating modes of the vehicle such as starting, steady running, kickdown, manual gear shifting, and braking to avoid the hunting, thereby optimizing the response rate and convergence of shifting control.

Japanese Patent No. 2505420, as an example of the control gain adjustment, teaches increasing the control gain at sudden deceleration or braking over that during normal traveling to speed up the upshift operation.

Japanese Patent First Publication No. 7-167234, as an example of the correction of the target controlled parameter, teaches limiting the speed at which the target primary speed is reduced for avoiding the transmission hunting due to undershooting of an actual primary speed resulting from excessive integral control activity by a PID controller when the target primary speed is decreased suddenly, for example, by rapid closing of a throttle valve of the vehicle.

The above conventional techniques, however, encounter drawbacks, as discussed below, due to the nature of PID control.

(1) Control software is complex because of control gain adjustment or target parameter correction performed in each operating mode of the vehicle.

(2) It is necessary to adjust a target control gain or the amount of correction of a target controlled parameter in each operating mode of the vehicle, and the development of software consumes considerable time.

As feedback control for alleviating the disadvantages of the PID control, the sliding mode control is known which has high robustness and hardly accounts for the above problems (1) and (2).

For example, Japanese Patent First Publication Nos. 8-249076, 61-271509, and 61-271510 and U.S. Pat. No. 5,216,342 disclose the so-called sliding mode control which subjects a servo mechanism to feedback control through a sliding mode controller based on a target value determined by a feedforward operation.

Usually, the sliding mode control involves the hunting, which would be not objectionable in the field of dynamic systems such as robot manipulators in which operating requirements are limited, but will be objectionable in control of, for example, a continuously variable transmission for automotive vehicles, thereby resulting in an uncomfortable ride.

SUMMARY OF THE INVENTION

It is therefore a principal object of the present invention to avoid the disadvantages of the prior art.

It is another object of the present invention to provide an apparatus for controlling a dynamic system under the sliding mode control and feedforward control which is designed to enhance the robustness of the sliding mode control without causing the hunting.

According to one aspect of the present invention, there is provided an apparatus for controlling a dynamic system under feedforward and sliding mode control comprising: (a) a state determining circuit that determines an actual sate of the controlled system; (b) a target state determining circuit that determines a target state of the controlled system based on the actual state determined by the state determining circuit; (c) a feedforward-controlled variable determining circuit that determines a variable controlled by the feedforward control based on the target state determined by the target state determining circuit; (d) a sliding mode-controlled variable determining circuit that determines a variable controlled by the sliding mode control based on a state deviation between the actual state and the target state determined by the state determining circuit and the target state determining circuit; and (e) a state controlling circuit that determines a manipulated variable based on the sum of the feedforward-controlled variable and the sliding mode-controlled variable to bring the actual state of the controlled system into agreement with the target state.

In the preferred mode of the invention, a filter is provided that removes a frequency component causing vibrations of the actual state of the controlled system from the state deviation between the actual state and the target state determined by the state determining circuit and the target state determining circuit.

A second filter may further be provided that removes a frequency component causing vibrations of the actual state of the controlled system from the manipulated variable provided by the state controlling circuit.

The sliding mode-controlled variable determining circuit determines the sliding mode-controlled variable based on a value of a given function of the state deviation which has a non-linear feedback term whose value is derived based on a value to which a state of the controlled system defined within a phase space of the sliding mode control is mapped through a non-linear feedback function f(s) and which is at least smaller in absolute value than a value derived in proportion to a distance between the state of the controlled system and a switching surface in the phase space within boundary layers across the switching surface.

The state of the controlled system is defined, in relation to the state deviation, as $$s = k1 \cdot \text{errs}' + k2 \cdot \text{err} + k3 \cdot \text{ierr} \tag{a}$$

where s is the sate of the controlled system, k1, k2, and k3 are zero (0) or finite real numbers, err is the state deviation, err' is a differential of err, and ierr is an integral of err.

When the distance between the state of the controlled system and the switching surface is greater than a given value, the sliding mode-controlled variable determining circuit interrupts an integral operation on the state deviation err in Eq. (a) and holds an integral value of the state deviation err determined so far.

The non-linear feedback term may be defined by a product of the value mapped by the non-linear function f(s) and a non-linear feedback gain.

The non-linear feedback term may alternatively be defined by a product of a non-linear feedback gain and the sum of a first value and a second value. The first value is a value to which an integral term (k3·ierr) in Eq. (a) is mapped through a non-linear feedback function. The second value is one of a value to which an differential term (k1·errs') and a proportional (k2·err) in Eq. (a) are mapped through a first function and the sum of values to which the differential term (k1·errs') and the proportional (k2·err) are mapped through different functions.

The non-linear feedback term may alternatively be defined by a product of a non-linear feedback gain and the sum of a first value to which an differential term (k1·errs') in Eq. (a) is mapped through a first function, a second value to which a proportional (k2·err) is mapped through a second function, and a third value to which an integral term (k3·ierr) is mapped through a third function. The first, second, and third functions may be identical with each other or alternatively be different from each other.

The width of one of the boundary layers within an area where the state of the controlled system lies in the phase space is greater than that of the other boundary layer.

A hunting determining circuit may be provided that determines whether the actual state of the controlled system is undergoing hunting or not. When the hunting determining circuit determines that the actual state is undergoing the hunting, the sliding mode-controlled variable determining circuit increases a width of each of the boundary layers in the phase space of the controlled system.

Alternatively the sliding mode-controlled variable determining circuit may add a smaller gain to the non-linear feedback term when the hunting determining circuit determines that the actual state is undergoing the hunting, while it adds a greater gain to the non-linear feedback term when the hunting determining circuit determines that the actual state is not undergoing the hunting.

The sliding mode-controlled variable determining circuit may define a switching surface in a phase space of the controlled system under the sliding mode control so as to show a phase lead-lag characteristic corresponding to a hunting frequency of the actual state of the controlled system determined by the state determining circuit.

The controlled system is, for example, a continuously variable transmission for an automotive vehicle. The target state determined by the target state determining circuit is a target gear ratio of the continuously variable transmission.

The continuously variable transmission can be of a belt-type which includes a first pulley and a second pulley around which a belt is wound. The first pulley includes a movable member and a stationary member opposed to the movable member through a groove with which the belt moves in engagement. The continuously variable transmission changes a gear ratio by changing a position of the movable member relative to the stationary member of the first pulley.

A gear ratio-pulley position converting circuit and an actual pulley position determining circuit are further provided. The gear ratio-pulley position converting circuit converts the target gear ratio of the continuously variable transmission into a target position of the movable member of the first pulley. The actual pulley position determining circuit determines an actual position of the movable member of the first pulley. The feedforward-controlled variable determining circuit determines the feedforward-controlled variable based on the target gear ratio and input torque of the continuously variable transmission. The sliding mode-controlled variable determining circuit determines the sliding mode-controlled variable based on the state deviation between the target position of the movable member of the first pulley and the actual position of the movable member of the first pulley.

The actual pulley position determining circuit determines an actual gear ratio based on the actual state determined by the state determining circuit and converts the actual gear ratio into the actual pulley position of the movable member of the first pulley.

The sliding mode-controlled variable determining circuit may alternatively determine the sliding mode-controlled variable based on the state deviation between the target speed of the movable member of the first pulley and the actual position of the movable member of the first pulley.

An input torque estimating circuit, a second pulley torque determining circuit, a gear ratio-pulley position converting circuit, and an actual pulley position determining circuit may further be provided. The input torque estimating circuit estimates an input torque of the continuously variable transmission. The second pulley torque determining circuit determines a target manipulated variable based on the input torque estimated by the input torque estimating circuit and the target gear ratio determined by the target state determining circuit to control a belt-holding force of the second pulley based on the target manipulated variable without any slippage of the belt on the second pulley. The gear ratio-pulley position converting circuit converts the target gear ratio of the continuously variable transmission into a target position of the movable member of the first pulley. The actual pulley position determining circuit determines an actual position of the movable member of the first pulley based on the actual state determined by the state determining circuit. The feedforward-controlled variable determining circuit determines the feedforward-controlled variable based on the target gear ratio determined by the target sate determining circuit, the input torque estimated by the input torque, and the target manipulated variable determined by the second pulley torque determining circuit. The sliding mode-controlled variable determining circuit determines the sliding mode-controlled variable based on the state deviation between the target position of the movable member of the first pulley and the actual position of the movable member of the first pulley. The state controlling circuit that determines the manipulated variable based on the sum of the feedforward-controlled variable and the sliding mode-controlled variable to control the actual position of the movable member of the first pulley.

The actual pulley position determining circuit determines an actual gear ratio based on the actual state determined by the state determining circuit and converts the actual gear ratio into the actual pulley position of the movable member of the first pulley.

The sliding mode-controlled variable determining circuit determines the sliding mode-controlled variable P2 according to an equation (a) below $$P2 = (-1/B0) \cdot ((s1+A0) \cdot err + k \cdot sat(s)) \qquad (a)$$

where s1 is a constant, sat(s) is a saturation function, s is defined by an equation (b) below, k is a gain satisfying a condition of an equation (c), and err is the state deviation between the target position and the actual position of the movable member of the first pulley and defined as in an equation (d) below $$s = s1 \cdot ierr + err \quad (b)$$

$$k > \max(|dA \cdot err|) + \max(|dB \cdot P2|) \quad (c)$$

$$d(err)/dt = A \cdot err + B \cdot P2 \quad (d)$$

where ierr is defined as in an equation (e) below, A and B are values depending upon the belt-holding force of the second pulley, the input torque, and the target gear ratio, $dA=|A-A0|$, $dB=|B-B0|$, A0 and B0 are nominal values of A and B $$ierr = \int err \cdot dt \quad (e)$$

The sliding mode-controlled variable determining circuit may alternatively determine the sliding mode-controlled variable P2 according to an equation (f) below $$P2 = (-1/E0) \cdot [(s11 + D0) \cdot err + (s12 + C0) \cdot err' - k12 \cdot sat(s)] \quad (f)$$

where s11 and s12 are constant, sat(s) is a saturation function, s is defined by an equation (g) below, k12 is a gain satisfying a condition of an equation (h) below, err is the state deviation between the target position and the actual position of the movable member of the first pulley and defines as in an equation (i) below, and err' is an integral of err $$s = s11 \cdot ierr + s12 \cdot err + err' \quad (g)$$

$$k12 > \max(|dC \cdot err'|) + \max(|dD \cdot err|) + \max(|dE \cdot P2|) \quad (h)$$

$$d^2(err)/dt^2 = C \cdot err' + D \cdot err + E \cdot P2 \quad (i)$$

where C, D, and E are values depending upon the belt-holding force of the second pulley, the input torque, and the actual gear ratio, $dC=|C-C0|$, $dD=|D-D0|$, $dE=|E-E0|$, C0, D0, and E0 are nominal values of C, D, and E, and max ( ) is an indicates a maximum value of an variable in parentheses.

The sliding mode-controlled variable determining circuit may increase a width of each of the boundary layers as an input torque of the continuously variable transmission is increased.

The sliding mode-controlled variable determining circuit may also decrease a gain provided to the non-linear feedback term as an input torque of the continuously variable transmission is increased.

The sliding mode-controlled variable determining circuit may alternatively change the width of each of the boundary layers based on an actual gear ratio a state determined by the state determining circuit as the actual sate of the controlled system.

The sliding mode-controlled variable determining circuit may alternatively change the gain in the non-linear feedback term based on the actual gear ratio the state determined by the state determining circuit as the actual sate of the controlled system.

The sliding mode-controlled variable determining circuit may alternatively change the width of each of the boundary layers based on a torque ratio of an input torque of the continuously variable transmission to a maximum torque allowing the belt to transmit the input torque between the first pulley and the second pulley without any slippage.

The sliding mode-controlled variable determining circuit may alternatively change the gain in the non-linear feedback term based on the torque ratio of the input torque of the continuously variable transmission to the maximum torque.

The sliding mode-controlled variable determining circuit may alternatively change the width of each of the boundary layers based on at least two of the input torque of the continuously variable transmission, the actual gear ratio of the continuously variable transmission, and the torque ratio of the input torque to the maximum torque.

The sliding mode-controlled variable determining circuit may alternatively change the gain in the non-linear feedback term based on at least two of an input torque of the continuously variable transmission, the actual gear ratio of the continuously variable transmission, and the torque ratio of the input torque to the maximum torque.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENTS

Figure 1:
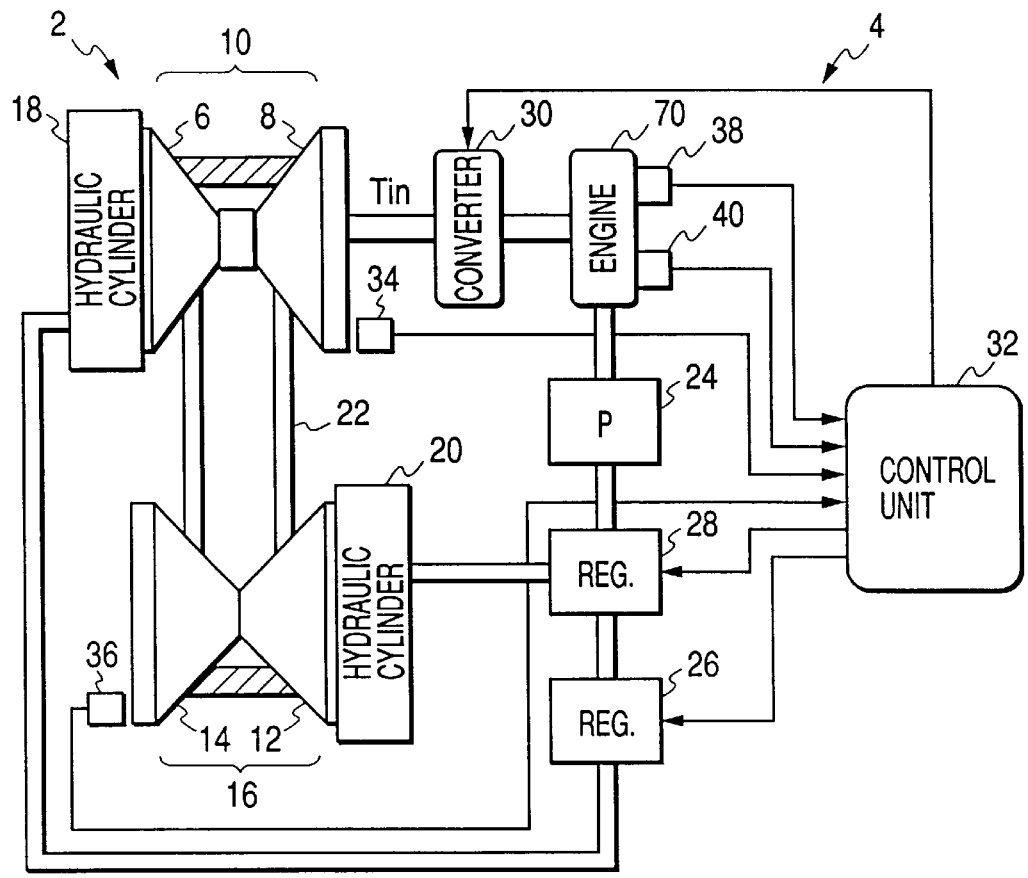
FIG. 1 is a block diagram which shows a structure of a control system of the invention is used with a continuously variable transmission for automotive vehicles.

Referring now to the drawings, particularly to FIG. 1, there is shown a control system 4 according to the first embodiment of the invention which is, as one example, used with a continuously variable transmission 2 for an automotive vehicle.

The continuously variable transmission 2 generally includes a primary pulley 10, a secondary pulley 16, a primary pulley cylinder 18, a secondary pulley cylinder 20, a metallic power-transmission belt 22 wound around the primary and secondary pulleys 10 and 16, an oil pump 24, a primary pressure control actuator 26, a secondary pressure control actuator 28, and a starting device 30 such as a torque converter adjusting torque transmission from an engine 70 to the primary pulley 10.

The primary pulley 10 consists of a movable conical disc 6, a stationary conical disc 8. Similarly, the secondary pulley 16 consists of a movable conical disc 12 and a stationary conical disc 14. The oil pump 24 is operated by the engine 70 to supply hydraulic pressure to the primary and secondary pulley cylinders 18 and 20 through the primary and secondary pressure control actuators 26 and 28. The primary pulley cylinder 18 exerts the hydraulic pressure on the movable conical disc 6 to move it to or away from the stationary conical disc 8 to change the width of a groove with which the belt 22 travels in engagement, thereby changing a diameter ratio of a belt travel path of the primary pulley 10 to a belt travel path of the secondary pulley 16 to change a gear ratio. The changing of the gear ratio may alternatively be achieved by adjusting the width of a groove of the secondary pulley 16 or the width of the grooves of both the primary and secondary pulleys 10 and 16. Such arrangements are well known in the art, and explanation thereof in detail will be omitted here. The control system 4 of the invention may, thus, be used with such different types of continuously variable transmission.

The control system 4 includes a control unit 32 having an electronic control circuit, a primary speed sensor 34 measuring the speed of the primary pulley 10, a secondary speed sensor 36 measuring the speed of the secondary pulley 16, a throttle position sensor 38 measuring the angular position or opening degree of a throttle valve adjusting the amount of intake air supplied to the engine 70, and an engine speed sensor 40.

The control unit 32 is made up of a microcomputer having a CPU and designed to determine a target gear ratio of the transmission 2 based on a transmission condition monitored using sensor signals from the primary speed sensor 34, the secondary speed sensor 36, the throttle position sensor 38, and the engine speed sensor 40 to regulate through the primary pressure control actuator 26 the hydraulic pressure supplied from the oil pump 24 to the primary pulley cylinder 18 for achieving the target gear ratio. The control unit 32 also controls the secondary pressure control actuator 28 to regulate the hydraulic pressure from the oil pump 24 to the secondary pulley cylinder 20 for avoiding slippage of the belt 22.

The transmission control performed by the control unit 32 will be discussed below in detail with reference to FIGS. 2 and 3.

Figure 2:
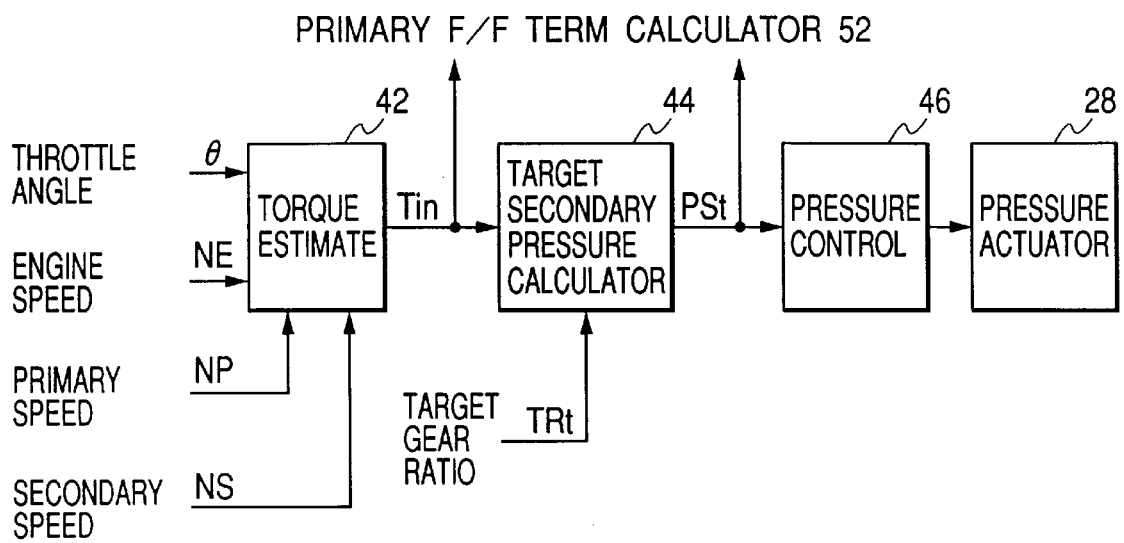
FIG. 2 is a block diagram which shows a hydraulic control circuit for a secondary pulley 16 in FIG. 1.

FIG. 2 is a block diagram showing a hydraulic control circuit for the secondary pulley 16 provided in the control unit 32 which serves to control through the secondary pressure control actuator 28 a measure of holding force developed by the movable conical disc 12 and the stationary conical disc 14 to avoid slippage of the belt 22 on the secondary pulley 16. The operations of an input torque estimating circuit 42 and a target secondary pressure determining circuit 44 are executed logically in the CPU of the control unit 32. A secondary pressure controlling circuit 46 is a driver built in the control unit 32 which operates the secondary pressure control actuator 28.

Figure 4:
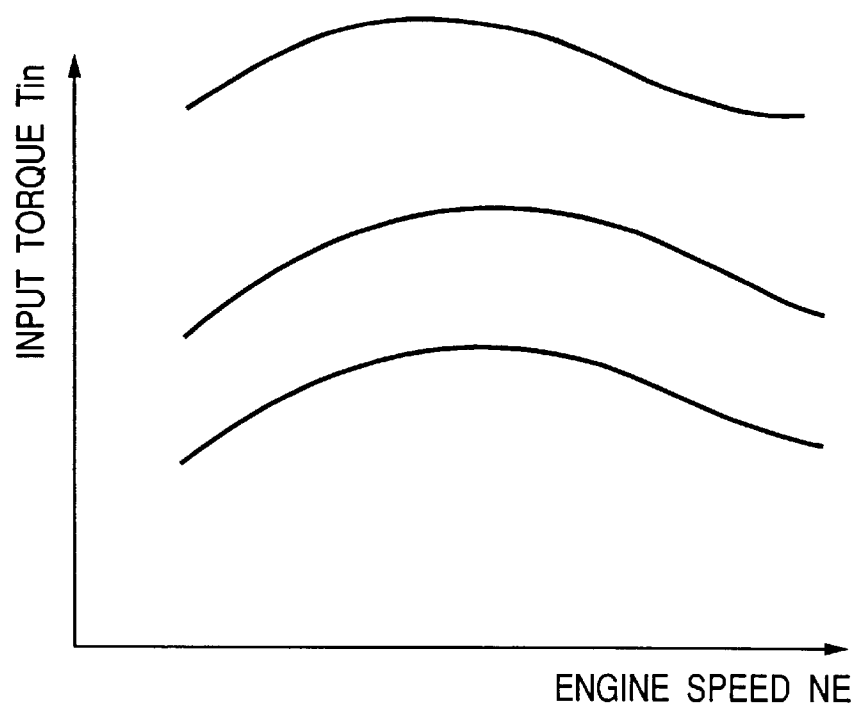
FIG. 4 is a map used In determining an input torque Tin to a transmission based on an engine speed NE in terms of the extent of an angular position of a throttle valve.

Upon activation of the control unit 3, the input torque estimating circuit 42 estimates an input torque Tin inputted to the transmission 2 from the engine 70 through the torque converter 30 by look-up using a map, as shown in FIG. 4, based on the angular position θ of the throttle valve measured by the throttle position sensor 38 and the engine speed NE measured by the engine speed sensor 40.

Figure 5:
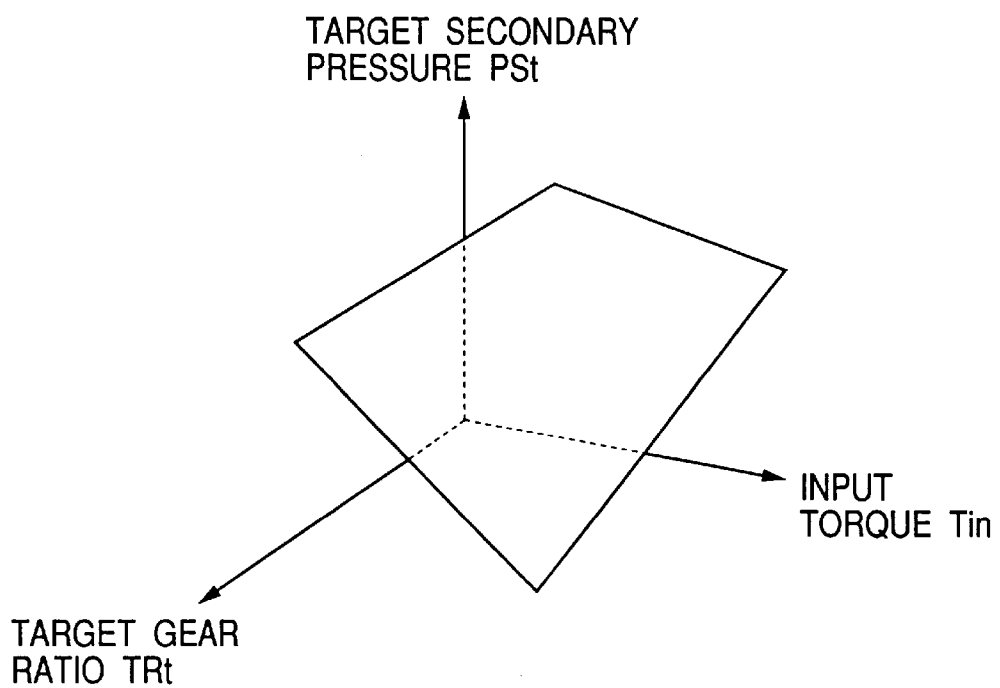
FIG. 5 is a three-dimensional map used in determining a target secondary pressure PSt based on an input torque Tin and a target gear ratio TRt.

The target secondary pressure determining circuit 44 determines a target secondary pressure PSt based on the input torque Tin estimated by the input torque estimating circuit 42 and a target gear ratio TRt determined by a target gear ratio determining circuit 48, as will be described later in detail. The target secondary pressure PSt is set to a pressure level required for torque transmission from the belt 22 to the secondary pulley 16 without any slippage and determined by look-up using a three-dimensional map, as shown in FIG. 5.

The secondary pressure controlling circuit 46 is responsive to a signal indicative of the target secondary pressure PSt outputted from the target secondary pressure determining circuit 44 to control the activation of the secondary pressure control actuator 28 so that the secondary pulley cylinder develops a secondary pressure PS establishing the torque transmission of the belt 22 without any slippage.

Figure 3:
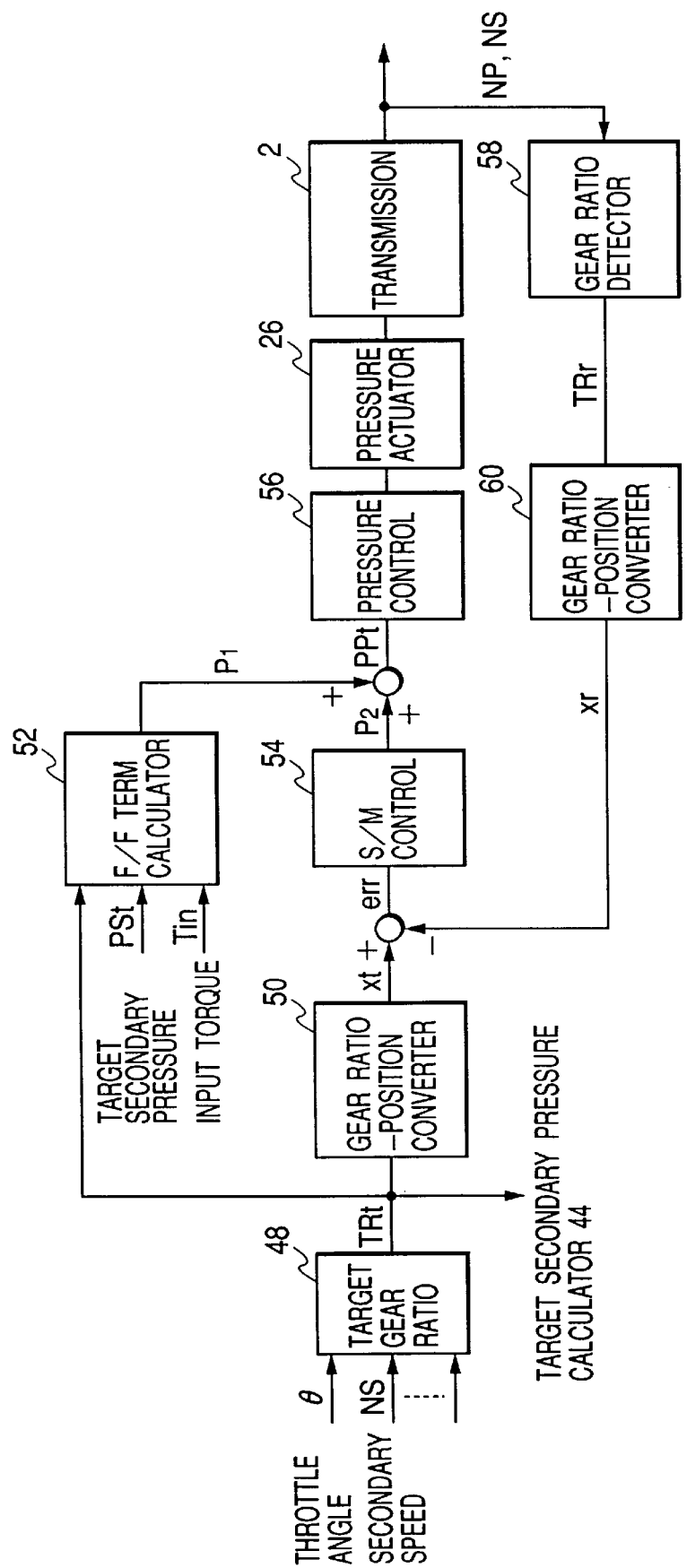
FIG. 3 is a block diagram which shows a hydraulic control circuit for a primary pulley 10 in FIG. 1.

FIG. 3 is a block diagram showing a hydraulic control circuit for the primary pulley 10 provided in the control unit 32 which serves to move through the primary pressure control actuator 26 the movable conical disc 6 to change a groove width of the primary pulley 10 with which the belt 22 moves in engagement, bringing a speed ratio (i.e., a gear ratio) of the primary pulley 10 to the secondary pulley 16 into agreement with the target gear ratio TRt. The operations of a target gear ratio determining circuit 48, a gear ratio-pulley position converting circuit 50, a primary pressure feedforward term calculating circuit 52, a sliding mode control circuit 54, an actual gear ratio determining circuit 58, and a gear ratio-pulley position converting circuit 60 are performed logically in the CPU of the control unit 32. A primary pressure controlling circuit 56 is a driver built in the control unit 32 which operates the primary pressure control actuator 26.

Upon activation of the control unit 3, the target gear ratio determining circuit 48 determines a target gear ratio TRt by look-up using a known map based on the angular position θ of the throttle valve measured by the throttle position sensor 38, the secondary speed NS measured by the secondary speed sensor 36, and parameters derived by the other sensors which indicate operating conditions of the transmission 2 and the engine 70.

The primary pressure feedforward term calculating circuit 52 determines a target primary pressure feedforward term P1 based on the target gear ratio TRt, the target secondary pressure PSt, and the input torque Tin in the following manner.

Figure 6:
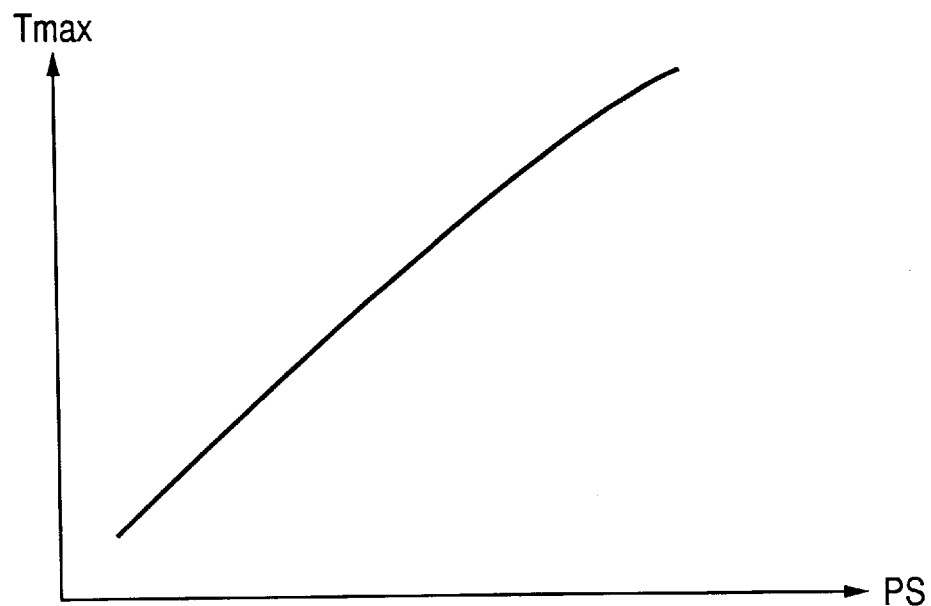
FIG. 6 is a graph which shows the relation between a secondary pressure PS and an input torque Tin

First, a maximum torque Tmax allowing the belt 22 to transmit the torque from the primary pulley 10 to the secondary pulley 16 without any slippage on the secondary pulley 16 is determined by look-up using a secondary pressure-input torque map, as shown in FIG. 6. Next, a torque ratio Tin/Tmax of the input torque Tin to the maximum torque Tmax is calculated. Finally, a hydraulic pressure ratio PP/PS of the primary pressure PP to the secondary pressure PS is determined based on one of gear ratio curves mapped in a primary pressure feedforward term table, as shown in FIG. 7, corresponding to the torque ratio Tin/Tmax and then multiplied by the target secondary pressure PSt to derive the target primary pressure feedforward term P1.

Figure 7:
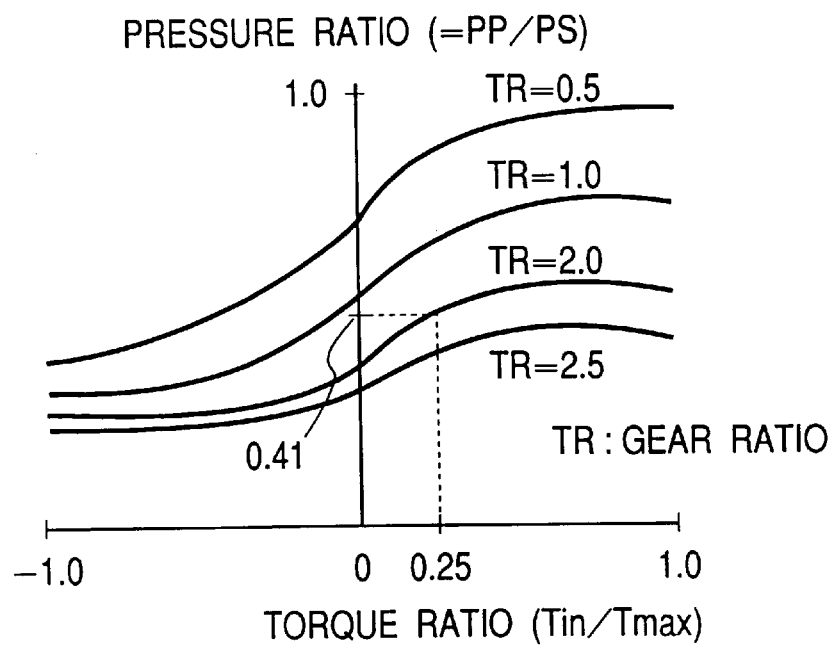
FIG. 7 is a map which shows the relation between a torque ratio Tin/Tmax and a hydraulic pressure ratio PP/PS in terms of a gear ratio TR.

For example, if the torque ratio Tin/Tmax is 0.25, and the target gear ratio TRt is 2.0, then the hydraulic pressure ratio PP/SS, as can be seen in FIG. 7, is 0.41. It is then multiplied by PSt to determine the target primary pressure feedforward term P1 (i.e., P1=0.41·PSt). The map in FIG. 7 is only an example and should be selected depending upon the type of the transmission 2.

The target gear ratio TRt determined by the target gear ratio determining circuit 48 is also supplied to the gear ratio-pulley position converting circuit 50. The gear ratio-pulley position converting circuit 50 converts the target gear ratio TRt into a target pulley position xt to which the movable conical disc 6 of the primary pulley 10 is to be moved.

The actual gear ratio determining circuit 58 monitors sensor signals from the primary speed sensor 34 and the secondary speed sensor 36 to determine a ratio of the primary speed NP to the secondary speed NS and calculates an actual gear ratio TRr of the transmission 2. The gear ratio-pulley position converting circuit 60 converts the actual gear ratio TRr into an actual pulley position xr at which the movable conical disc 6 of the primary pulley 10 is held.

After the target pulley position xt and the actual pulley position xr are determined by the gear ratio-pulley position converting circuit 50 and the gear ratio-pulley position converting circuit 60, an error or deviation err thereof is mathematically calculated according to the equation below and inputted to the sliding mode control circuit 54.

$$\text{err} = xr - xt \tag{1}$$

The sliding mode control circuit 54 determines a primary pressure feedback term P2 in the sliding mode control based on the deviation err in a manner discussed below.

Assume that the primary pressure feedforward term P1 corresponds to the target pulley position xt. Based on experimental data about the structure shown in FIG. 1, the primary pressure feedback term P2 and the deviation err can be thought of bearing a relation indicated by an approximate expression below.

$$d(\text{err})/dt = A \cdot \text{err} + B \cdot P2 \tag{2}$$

where A and B are values dependent upon the actual secondary pressure PS, the input torque Tin, and the actual gear ratio TRr.

In order to eliminating the steady-state error, a variable ierr is defined according to a deviation integral formula below.

$$\text{ierr} = \int \text{err} \cdot dt \tag{3}$$

Next, the state s in the sliding mode control is defined according to the following relation (a sliding surface is defined by s=0).

$$s = s1 \cdot \text{ierr} + \text{err} \tag{4}$$

Figure 8:
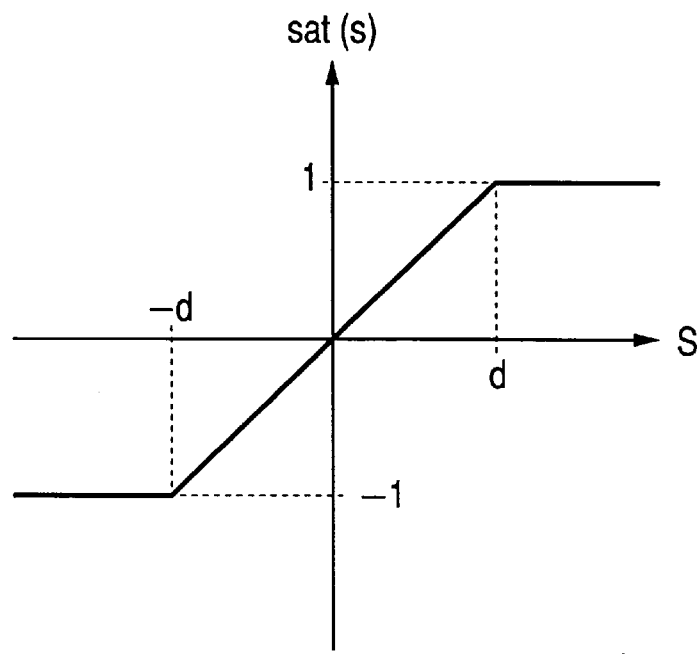
FIG. 8 is a graph which shows a saturation function sat(s) used in the first embodiment.
Figure 9:
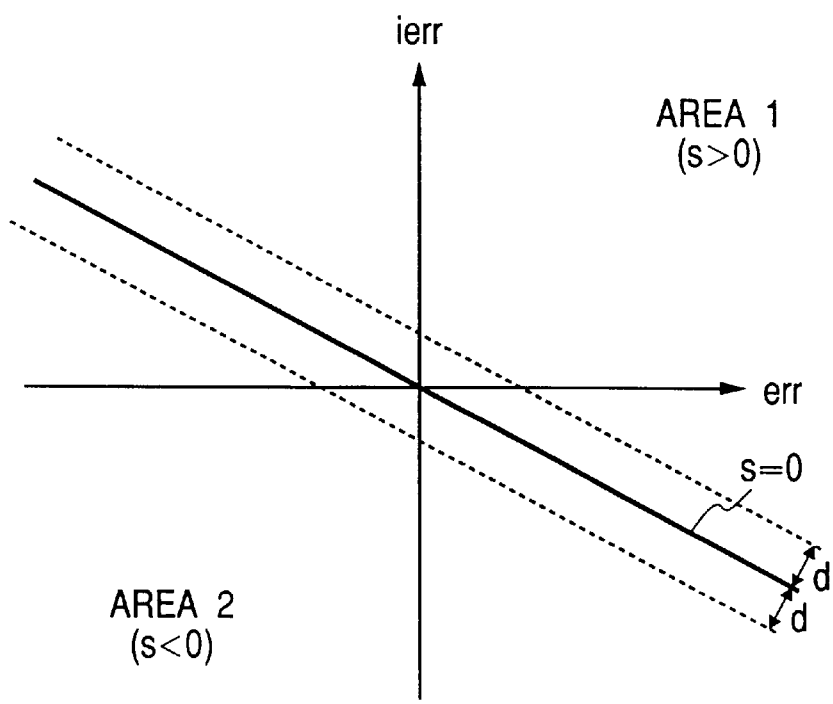
FIG. 9 is a graph which shows boundary layer lying on both sides of a switching surface in a phase space of a controlled dynamic system in the first embodiment.

Using Eqs. (3) and (4), the primary pressure feedback term P2 is defined as follows:

$$P2 = (-1/B0) \cdot ((s1 + A0) \cdot \text{err} + k \cdot \text{sat}(s)) \tag{5}$$

where A0 and B0 are nominal values of the variables A and B, sat(s) is a saturation function, as shown in FIG. 8 wherein d indicates the width of each of boundary layers defined on both sides of the switching surface (s=0) in a phase space in FIG. 9, and k is the gain of a non-linear feedback term (also called robustness parameter).

If A and B change to have values different from A0 and B0, respectively, the value of k must satisfy the following inequality in order to have the actual pulley position xr track the target pulley position xt.

$$k > \max(|dA \cdot \text{err}|) + \max(|dB \cdot P2|) \qquad (6)$$

where max ( ) indicates a maximum value of an variable in parentheses. Note that $dA=|A-A0|$ and $dB=B-B0|$.

Eq. (6) is derived in the following manner.

If, in Eq. (2), A=A0+dA, and B=B0+dB, then Eq. (2) can be rewritten as $$d(\text{err})/dt = (A0 + dA) \cdot \text{err} + (B0 + dB) \cdot P2 \qquad (7)$$
$$= A0 \cdot \text{err} + B0 \cdot P2 + dA \cdot \text{err} + dB \cdot P2$$

Differentiating Eq. (4), we obtain $$s' = s1 \cdot d(\text{ierr})/dt + d(\text{err})/dt \qquad (8)$$
$$= s1 \cdot \text{err} + A0 \cdot \text{err} + B0 \cdot P2 + dA \cdot \text{err} + dB \cdot P2$$

Substituting Eq. (5) into Eq. (8), s' is given by $$s' = s1 \cdot \text{err} + A0 \cdot \text{err} - \qquad (9)$$
$$(s1 + A0) \cdot \text{err} - k \cdot \text{sat}(s) +$$
$$dA \cdot \text{err} + dB \cdot P2$$
$$= -k \cdot \text{sat}(s) + dA \cdot \text{err} + dB \cdot P2$$

Since the sliding mode is produced when s'·s<0, it is found that satisfaction of Eq. (6) is enough for Eq. (9) to show a sign different from that of s in terms of all possible values of dA and dB.

In the above manner, the primary pressure feedback term P2 is determined by sliding mode control circuit 54 and then added to the primary pressure feedforward term P1 determined by the primary pressure feedforward calculating circuit 52 to provide the target primary pressure PPt to the primary pressure controlling circuit 56.

The primary pressure controlling circuit 56 provides a control signal to the primary pressure control actuator 26 based on the target primary pressure PPt to produce the primary pressure PP through the primary pulley cylinder 18 which changes the position of the movable conical disc 6 relative to the stationary conical disc 8 to bring the actual gear ratio TRr of the transmission 2 into agreement with the target gear ratio TRt as well as avoiding the slippage of the belt 22.

As apparent from the above discussion, the control system 4 of this embodiment calculates a feedforward-controlled variable (i.e., the primary pressure feedforward term P1) through the primary pressure feedforward term calculating circuit 52 in addition to a feedback-controlled variable (i.e., the primary pressure feedback term P2) provided by the sliding mode control circuit 54 and adjusts the hydraulic pressure in the primary pulley cylinder 18 to the target primary pressure PPt that is determined based on the sum of the primary pressure feedforward term P1 and the primary pressure feedback term P2, thereby achieving the target gear ratio TRt in the continuously variable transmission 2.

Specifically, the target primary pressure PPt contains not only the feedback-controlled variable provided by the sliding mode control, but also the feedforward-controlled variable provided by the feedforward control. The controlled variable by the sliding mode control is, thus, decreased by an amount depending upon the feedforward-controlled variable. This means that it is possible to decrease the non-linear feedback term gain in the sliding mode control, thereby avoiding the hunting at a quick response rate of the system, as will be discussed below.

Figure 10A:
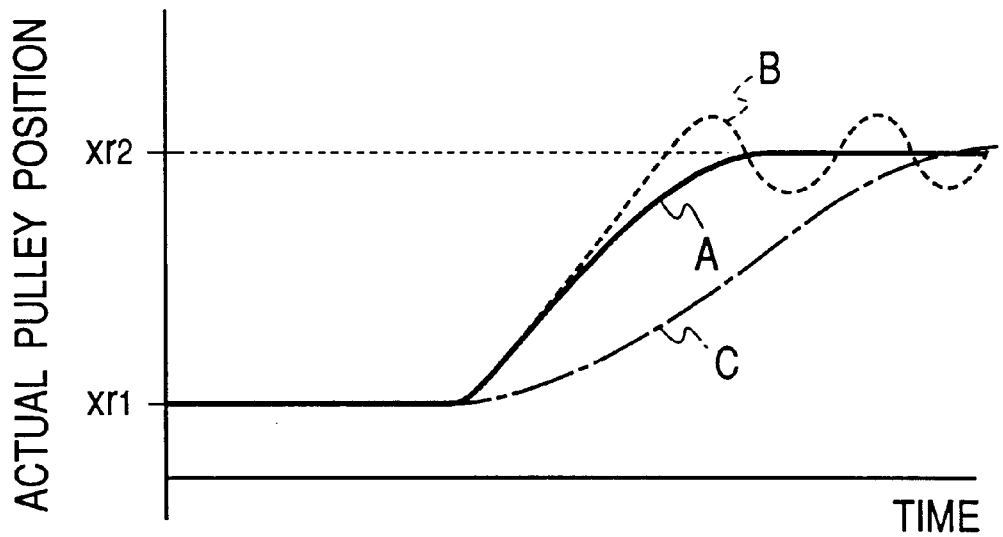
FIG. 10(a) is a time chart which shows an actual pulley position varying with time under control of the first embodiment and actual pulley positions of comparative examples.
Figure 10B:
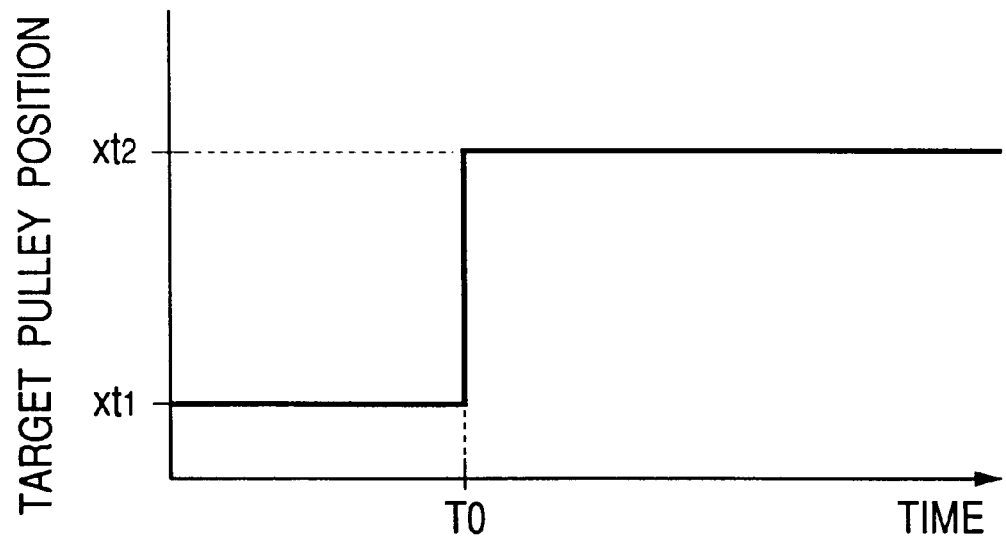
FIG. 10(b) is a time chart which shows a target pulley position.

As shown by a solid line in FIG. 10(b), when the target gear ratio TRt changes so that the target pulley position of the primary pulley 10 is shifted from xt1 to xt2, the hunting caused by the sliding mode control is, as shown by a solid line A in FIG. 10(a), reduced by an amount depending upon the feedforward-controlled variable (i.e., the primary pressure feedforward term P1). In FIG. 10(a), broken lines B and C each indicate, as comparative examples, the response rate of the primary pulley 10 (i.e., the movable conical disc 6) under control only using the feedback-controlled variable (i.e., the primary pressure feedback term P2). Specifically, the line B illustrates for the case where the sliding mode control is adapted to the response rate of the primary pulley 10 at which the actual pulley position tends to the target pulley position and shows that the actual pulley position changes quickly in response to change of the target pulley position, but the hunting occurs due to a high gain in the sliding mode control. The line C illustrates for the case where the sliding mode control is adapted to the stability and shows that no hunting occurs in the steady state, but rising of the response rate of the primary pulley 10 is slow.

Figure 11:
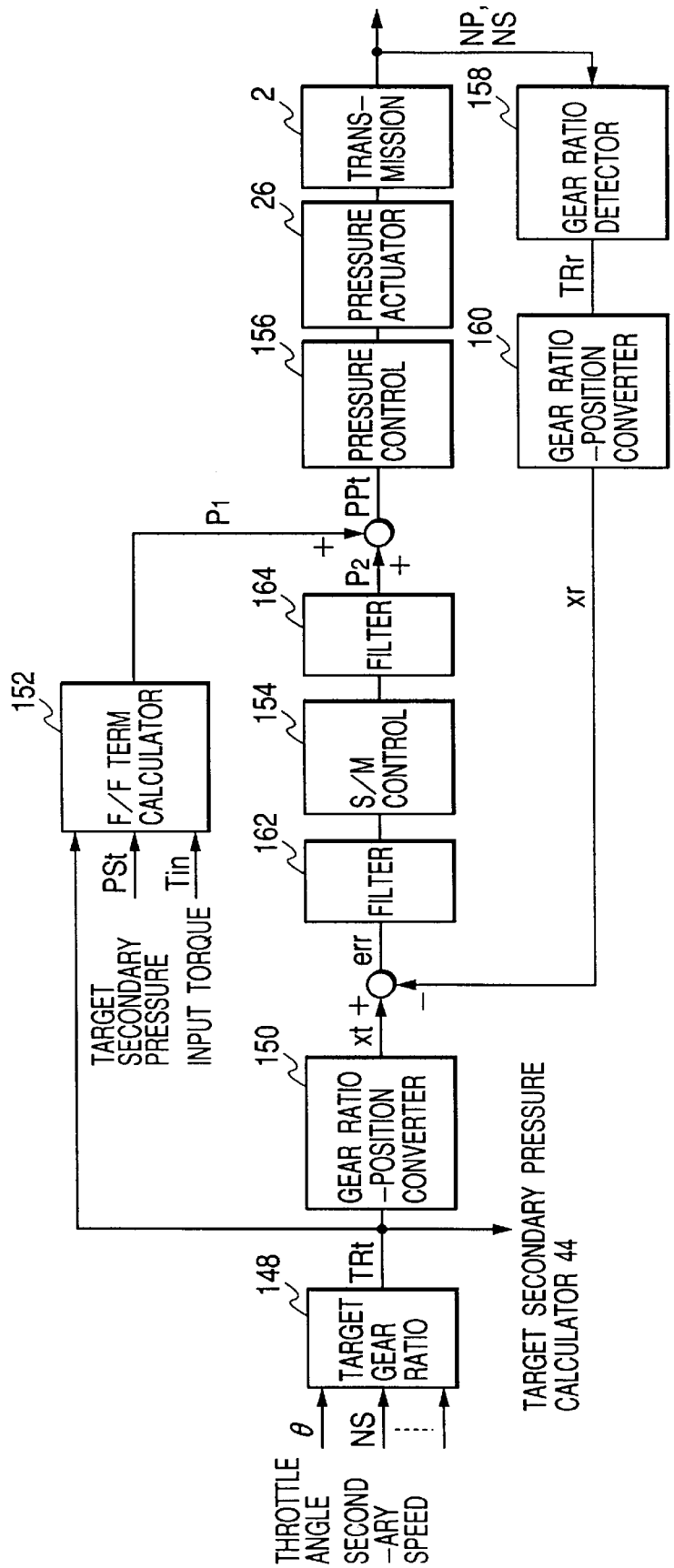
FIG. 11 is a block diagram which shows a hydraulic control circuit for a primary pulley according to the second embodiment.

FIG. 11 shows a hydraulic control circuit for the primary pulley according to the second embodiment of the invention which is different from the one of FIG. 3 only in that first and second filters 162 and 163 are disposed on both sides of the sliding mode control circuit 154. Other circuit arrangements are identical, and explanation thereof in detail will be omitted here.

The first filter 162 is made of a low-pass filter or a band-pass filter which removes hunting-causing frequency components from the deviation err to reduce the gear ratio hunting.

Similarly, the second filter 164 is made of a low-pass filter or a band-pass filter which removes hunting-causing frequency components from the primary pressure feedback term P2 outputted from the sliding mode control circuit 154 to reduce the gear ratio hunting further.

The reduction in hunting may also be achieved by either of the first and second filters 162 and 164. In this case, the use of the second filter 164 is preferable to the first filter 162.

Figure 12:
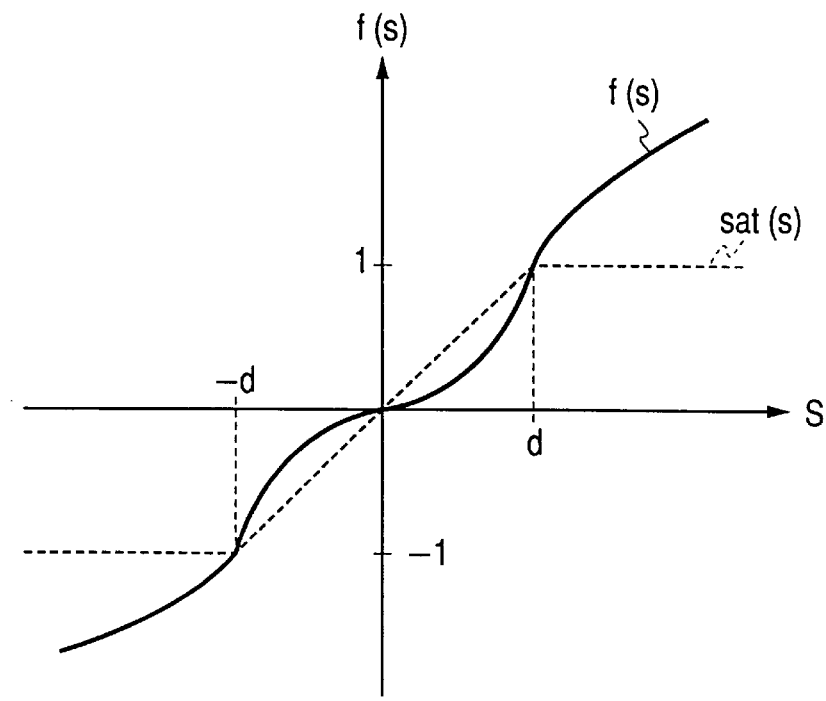
FIG. 12 shows a non-linear function f(s) used in the third embodiment as an alternative to the saturation function sat(s) in FIG. 8.

FIG. 12 shows a non-linear function f(s) used in the control system 4 according to the third embodiment as an alternative to the saturation function shown in FIG. 8.

The non-linear function f(s) provides, especially in boundary layers (−d<s<0, 0<s<d), the value of a non-linear feedback term, as indicated by a solid line, which is smaller in absolute value than values, as shown by broken lines, found in the first embodiment in proportion to the distance between the state s and the switching surface (s=0) of the controlled system of the transmission 2 within the phase space (i.e., the value of the saturation function sat(s) in FIG. 8). Therefore, when the state s enters the boundary layers, it is decreased more than that in the first embodiment, thereby enhancing the convergence on the switching surface, resulting in more reduction in control hunting.

Since |f(s)|>1 in areas (s<−d, s>d) outside the boundary layers, when the state s of the transmission 2 lies outside the boundary layers, the value of the non-linear feedback term becomes greater than that of the saturation function sat(s) to enhance the convergence on the boundary layers. This causes the state s to tend to the target gear ratio quickly. Once the state s enters the boundary layers, a variation thereof is, as described above, decreased greatly, thereby minimizing the hunting.

For instance, f(s) may be given by $$f(s)=\text{sqrt}(s)\cdot\text{sat}(s) \qquad (10)$$

where sqrt(s) is the square root of s.

The fourth embodiment will be described below with reference to FIGS. 13 and 14 which is different from the first embodiment only in Eq. (3).

Specifically, this embodiment is designed to interrupt the integral operation on the deviation err in Eq. (4) when the distance between the state s of a controlled system within the phase space in the sliding mode control and the switching surface becomes greater than a preselected value and to hold the integral value derived so far.

Figure 13:
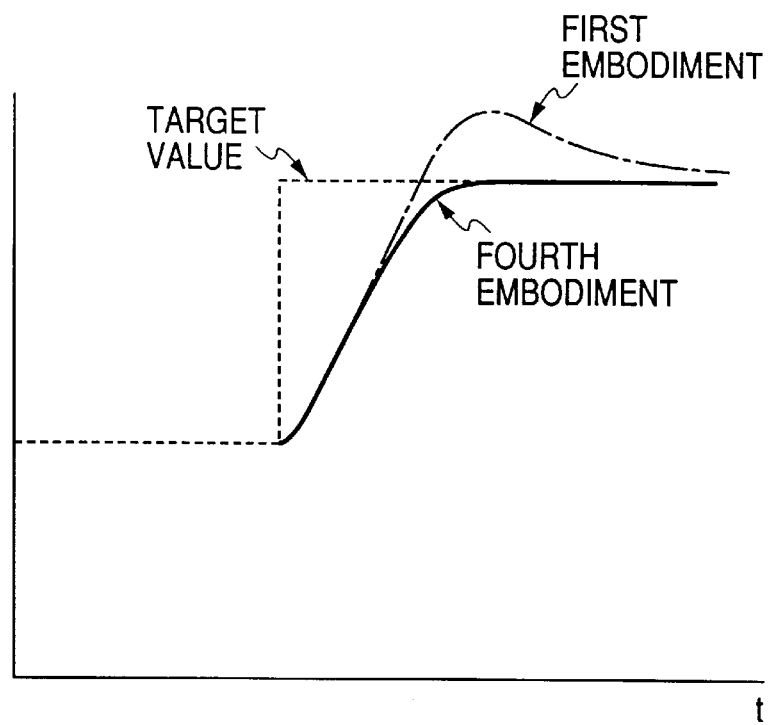
FIG. 13 is a graph which shows controlled variables tracking a target value in the first and fourth embodiments.
Figure 14:
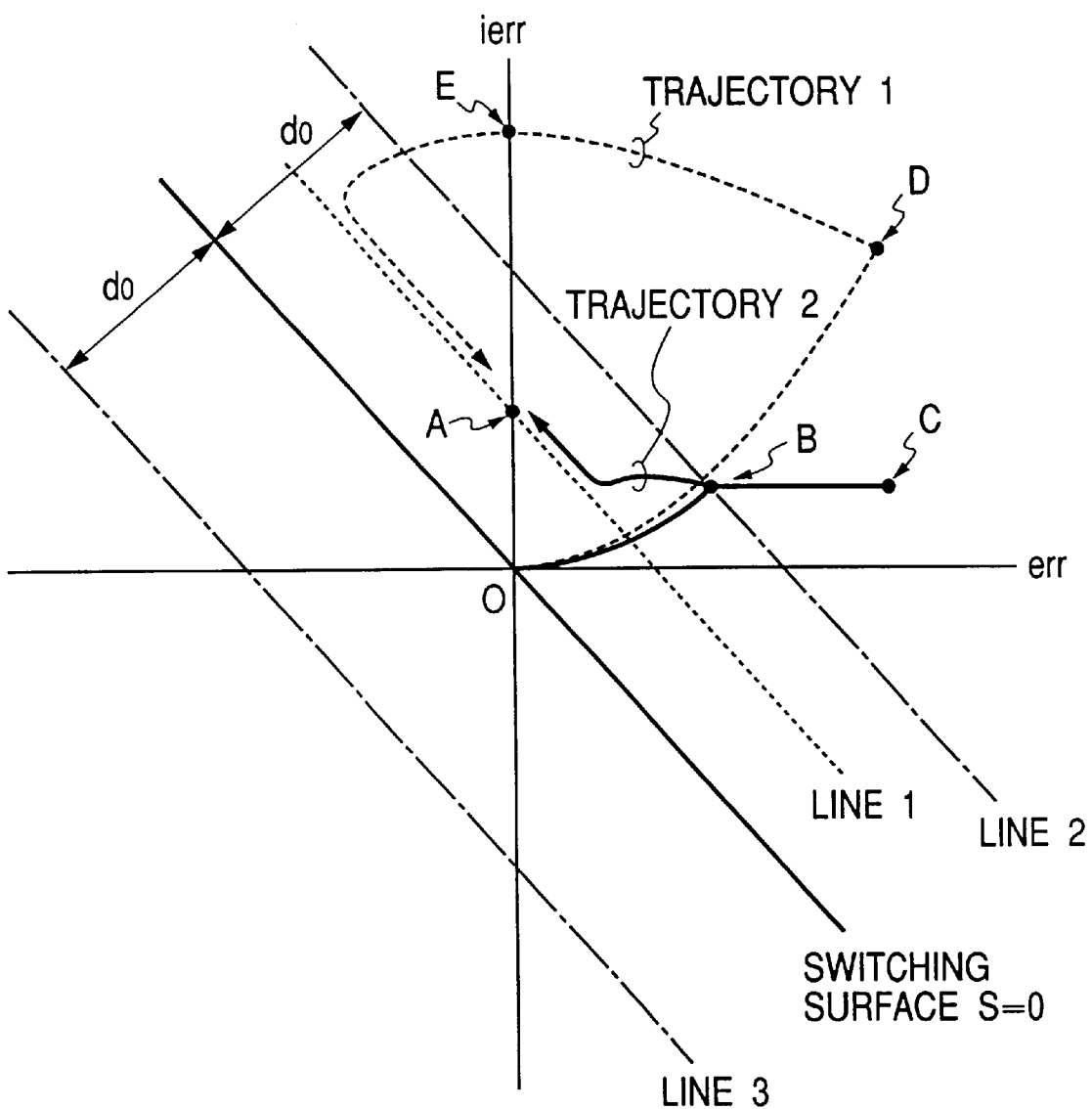
FIG. 14 is a graph which shows a variation in state s in a phase space of a controlled dynamic system in a comparative example.

Consider the response of a controlled system within the phase space shown in FIG. 14 when the gear ratio-pulley position converting circuit 50 in FIG. 3 provides a target value (i.e., the target pulley position xt) varying as shown in FIG. 13 in a stepwise fashion.

For the sake of simplicity, assume that the state of the controlled system lies on the origin of the phase space before the target value changes. Usually, the state of the controlled system in the steady state after the target value is changed by an error contained in the feedforward term lies at point A on the aids ierr within the phase space of FIG. 14, not at the origin.

If the integral in Eq. (4) is not interrupted as in the first embodiment, then the state tends to the point A along the trajectory 1, as shown in FIG. 14. Specifically, immediately after the target value changes, a positive deviation occurs, so that the value of ierr increases toward the positive side, thereby causing the state to move, as can be seen in FIG. 14, up to the right in the first quadrant. Subsequently, when the deviation err is decreased by the activity of feedback control, the state reaches point D. After the state passes point D, the deviation err decreases, but the sign thereof remains positive so that the value of ierr continues to increase. The state, thus, moves up to the left in the first quadrant. When the state reaches point E, it will cause the sign of the deviation err to become negative, so that the value of ierr decreases, thereby causing the state to move down to the left in the second quadrant. Subsequently, the state is moved by the activity of the sliding mode control along the line 1 extending parallel to the switching surface (s=0) and reaches balanced point A. Since the state, as discussed above, tends to balanced point A along the trajectory 1 through the first and second quadrants, the sign of the deviation err changes from positive to negative one, thereby causing the overshoot, as shown by a dashed line in FIG. 13, to occur.

The state of the system controlled by the fourth embodiment, on the other hand, reaches balanced point A along the trajectory 2 shown in FIG. 14. Specifically, immediately after the target value changes, a positive deviation occurs, similar to the first embodiment, to increase the value of ierr to the positive side, so that the state moves up to the right in the first quadrant. Subsequently, when the state reaches the line 2 (point B) extending at an interval of d0 away from the switching surface (s=0), the integral operation on the deviation err in Eq. (3) is interrupted, so that the state tends to point C in parallel to the axis err. When the deviation err is decreased by the activity of the feedback control, the state returns back to point B through the same trajectory. When the state reaches point B, it will cause the integral operation to be resumed, so that the value of ierr is increased again, thereby causing the state to travel up to the left in the first quadrant. The state is then moved by the activity of the sliding mode control along the line 1 extending parallel to the switching surface (s=0) and reaches balanced point A. In this manner, the state reaches balanced point A within the first quadrant, so that the sign of the deviation err is not changed, thereby resulting in no overshoot, as illustrated by a solid line in FIG. 13.

The avoidance of overshoot in the above manner is achieved under the condition that the value of ierr at point B should be smaller than one at balanced point A. If the value of ierr at point B is greater than that at balanced point A or if balanced point A lies on the negative side of the axis ierr in FIG. 14, the overshoot will occur under the control of this embodiment, but the degree thereof is smaller than that in the first embodiment, which will be discussed below.

Figure 15:
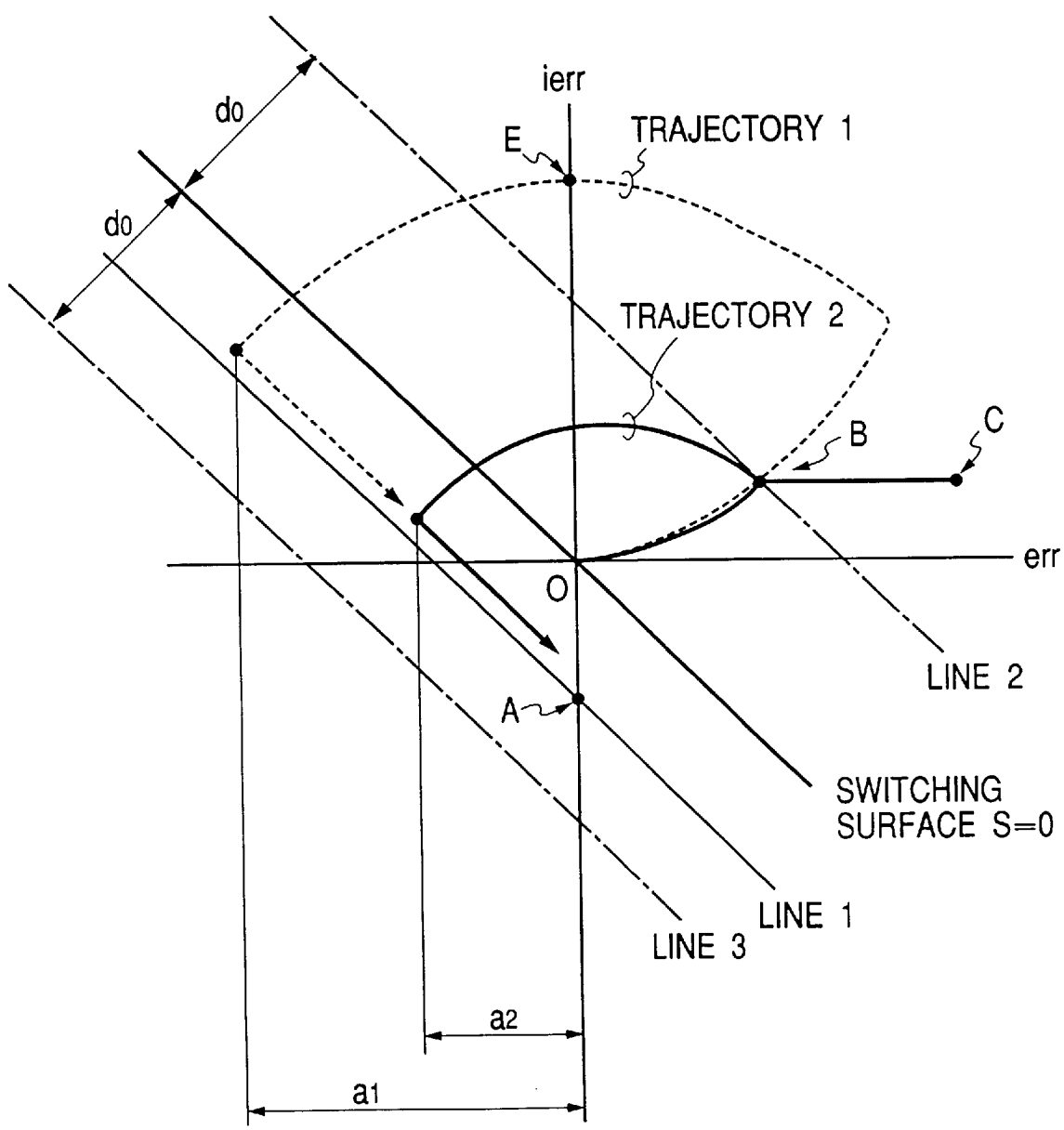
FIG. 15 is a graph which shows movement of the state s in a phase space of a controlled dynamic system under control of the fourth embodiment.

If balanced point A at which the controlled system is in the steady state lies on the negative side of the axis ierr, as shown in FIG. 15, the trajectory 2, similar to the first embodiment, reaches balanced point A in the third quadrant from the first quadrant through the second quadrant, but the amount of overshoot a2 along the trajectory 2 is, as can be seen from the drawing, always smaller than the amount of overshoot a1 along the trajectory 1.

The fifth embodiment will be described below which is different from the first embodiment in that in Eq. (5), the saturation functions sat1(s) and sat2(s), as shown in FIGS. 16 and 17, are used instead of the one shown in FIG. 8.

Figure 16:
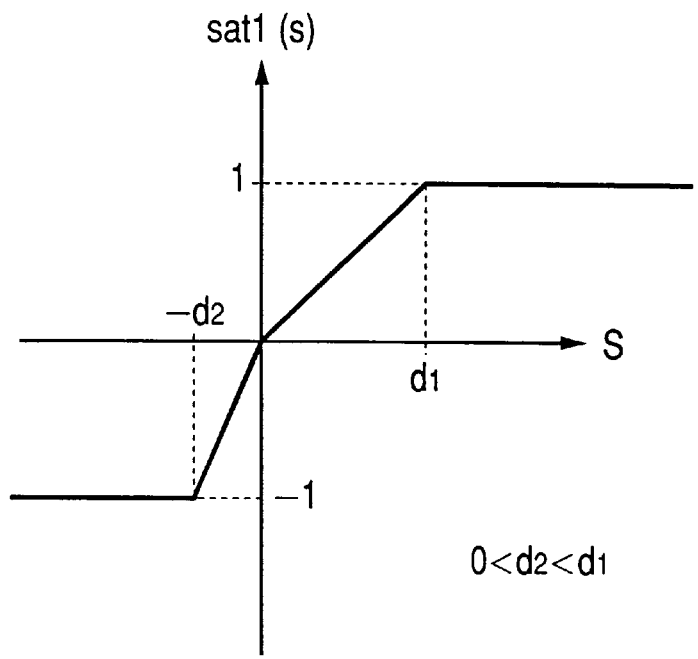
FIGS. 16 and 17 are graphs which show saturation functions sat1(s) and sat2(s) used in the fifth embodiment instead of the one shown in FIG. 8.
Figure 17:
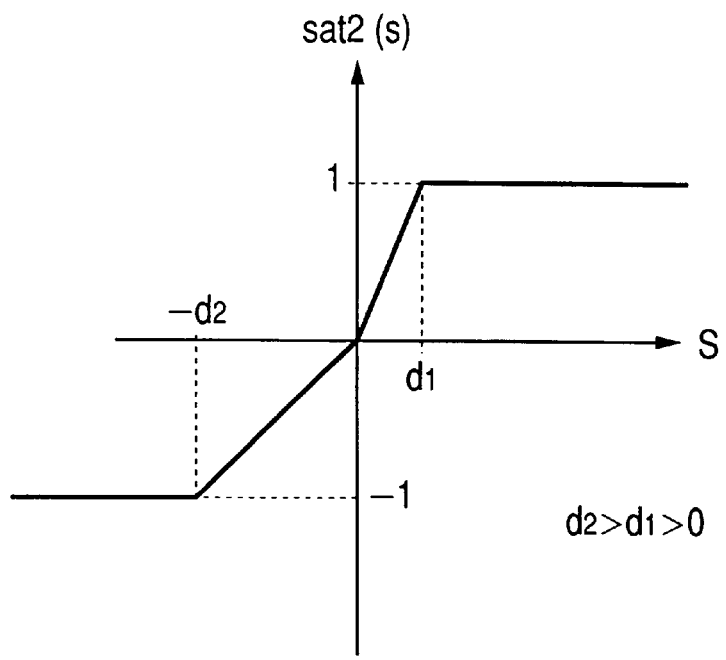
Figure 18:
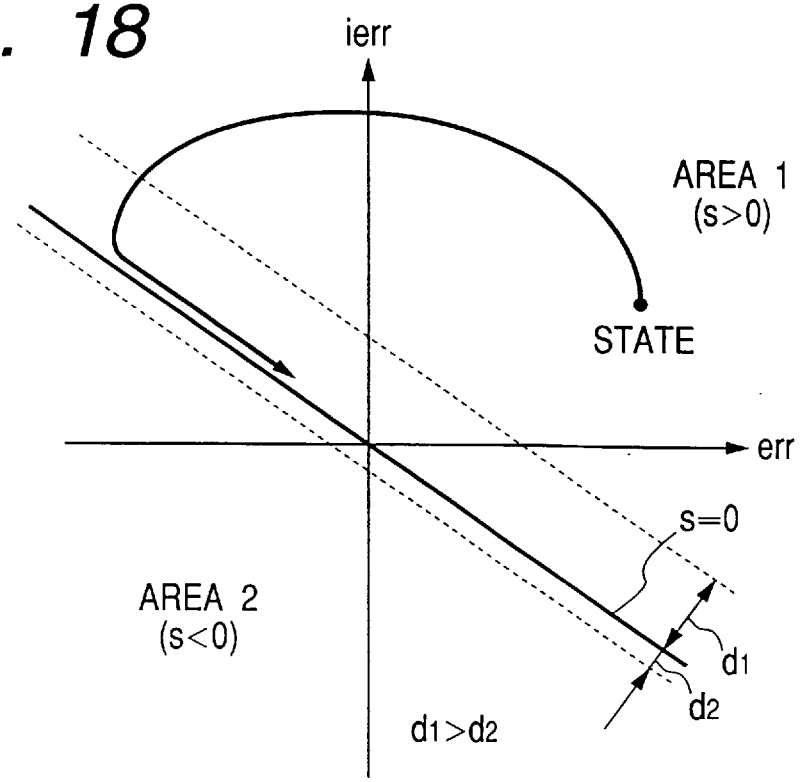
FIG. 18 is a graph which shows movement of the state s within an area 1 of a phase space of a controlled dynamic system under control of the fifth embodiment.
Figure 19:
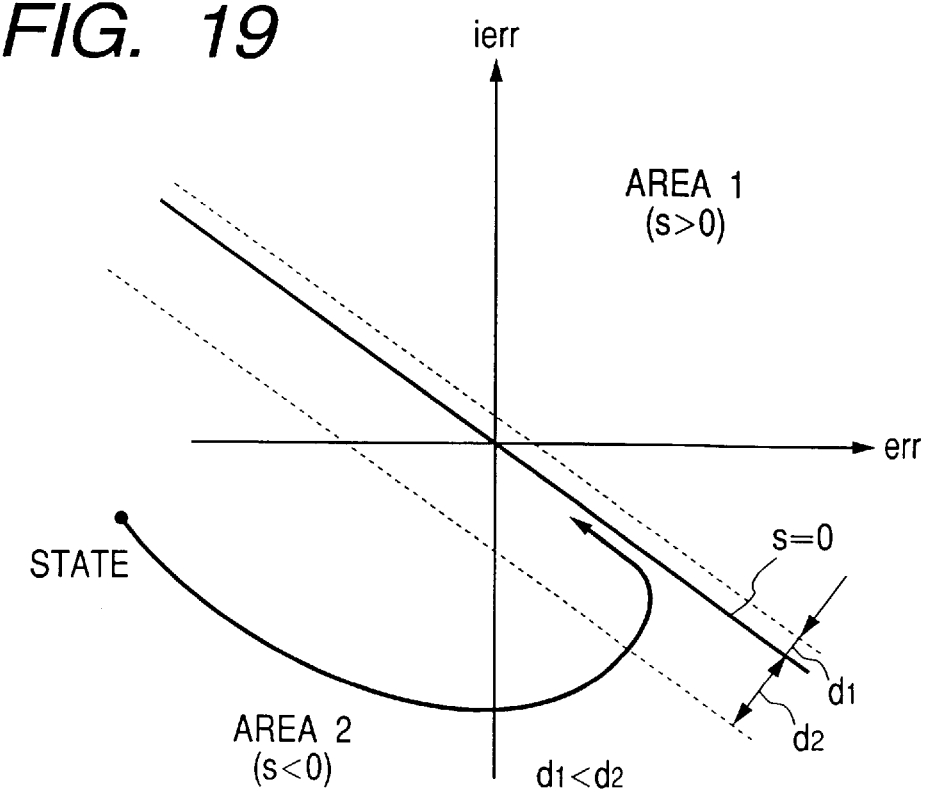
FIG. 19 is a graph which shows movement of the state s within an area 2 of a phase space of a controlled dynamic system under control of the fifth embodiment.

The saturation function sat1(s) in FIG. 16 is used when the state s of the controlled dynamic system falls within the area 1 (s>0), as shown in FIG. 18, while the saturation function sat2(s) in FIG. 17 is used when the state s falls within the area 2 (s<0), as shown in FIG. 19.

As can be seen in FIGS. 18 and 19, one of boundary layers lying in the area 1 or 2 where the state s is to be moved has the thickness d1 or d2 greater than that of the other boundary layer. In other words, the slope of each of the saturation functions sat1(s) and sat2(s) is smaller in one of the areas 1 and 2 where the state s is to be moved than that in the other area. This controls movement of the state s within corresponding one of the boundary layers as well as rapidly increasing an absolute value of each of the saturation functions sat1(s) and sat2(s) in the other boundary layer to prevent the state s from entering the other boundary layer across the switching surface (s=0). The convergence of the state s to the switching surface is, thus, enhanced, resulting in reduction in hunting.

Figure 20:
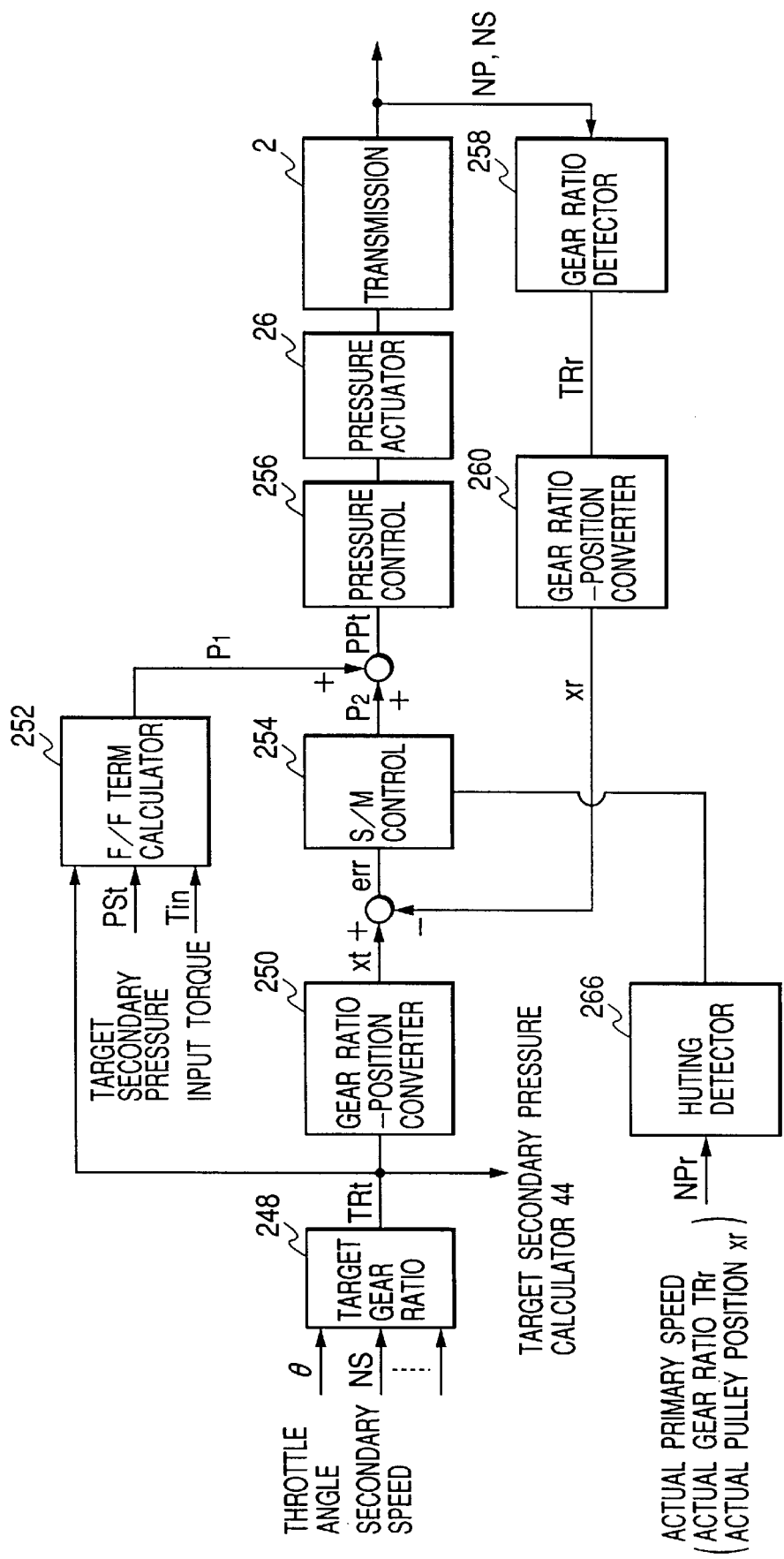
FIG. 20 shows a hydraulic control circuit for a primary pulley 10 according to the sixth embodiment of the invention.

FIG. 20 shows a hydraulic control circuit for the primary pulley 10 according to the sixth embodiment of the invention which is different from the one shown in FIG. 3 only in that a gear ratio hunting monitor 266 is provided. Other circuit arrangements are identical, and explanation thereof in detail will be omitted here.

The gear ratio hunting monitor 266 monitors the hunting of actual primary speed NPr to determine whether the gear ratio hunting is occurring or not and provides a signal indicative thereof to the sliding mode control circuit 254. When it is determined that the gear ratio hunting is now occurring, the sliding mode control circuit 254 performs an operation, as will be discussed later, to suppress the gear ratio hunting.

The determination of whether the gear ratio hunting is occurring or not is made in the following manner. First, the gear ratio hunting monitor 266 determines the actual primary speed NPr using a signal from the primary speed sensor 34, stores it in a memory, and calculates an average value NPa of the actual primary speed NPr every N sampling cycles according to the following equation.

$$NPa=(NPr[N]+NPr[N-1]+\ldots+NPr[1])/N \qquad (11)$$

where NPr[1] is the latest actual primary speed NPr, and NPr[N] is the actual primary speed NPr derived N−1 sampling cycles earlier.

Next, a hunting parameter Var is determined as $$Var = (NPr[N] - NPa)\hat{}\,2 + \qquad (12)$$
$$(NPr[N-1] - NPa)\hat{}\,2 + \cdots + (NPr[1] - NPa)\hat{}\,2$$

where ( )^2 indicates the square of a value within parentheses.

If the hunting parameter Var is greater than a preselected reference value, the gear ratio hunting monitor 266 decides that the gear ratio hunting is occurring, while if it is smaller than the preselected reference value, the gear ratio hunting monitor 266 decides that there is no hunting.

If it is determined that the gear ratio hunting is occurring, the sliding mode control circuit 254 minimizes the gear ratio hunting by, for example, increasing the width d of the boundary layers in the phase space, as shown in FIG. 9, by a given amount or decreasing the non-linear feedback term gain k in Eq. (5) by a given value. The sliding mode control circuit 254 continues to perform such an operation as long as the gear ratio hunting monitor 266 determines the gear ratio hunting to be occurring, so that the width d of the boundary layers is increased gradually toward a given upper limit or the non-linear feedback term gain k in Eq. (5) is decreased toward a given lower limit that is greater than zero (0). When the gear ratio hunting monitor 266 does not detect the gear ratio hunting for a predetermined period of time, the width d of the boundary layers and the non-linear feedback term gain k are returned gradually to initial ones. This quickly reduces vibrations of the state of the controlled dynamic system when the hunting occurs, while it enhances the convergence of the state to the desired state when there is no hunting.

The determination of the presence of the gear ratio hunting in the gear ratio hunting monitor 266 may alternatively be made by performing the operations in Eqs. (11) and (12) using, instead of the actual primary speed NPr, the actual gear ratio TRr determined by the actual gear ratio determining circuit 258 or the actual pulley position xr determined by the gear ratio-pulley position converting circuit 260.

Figure 21:
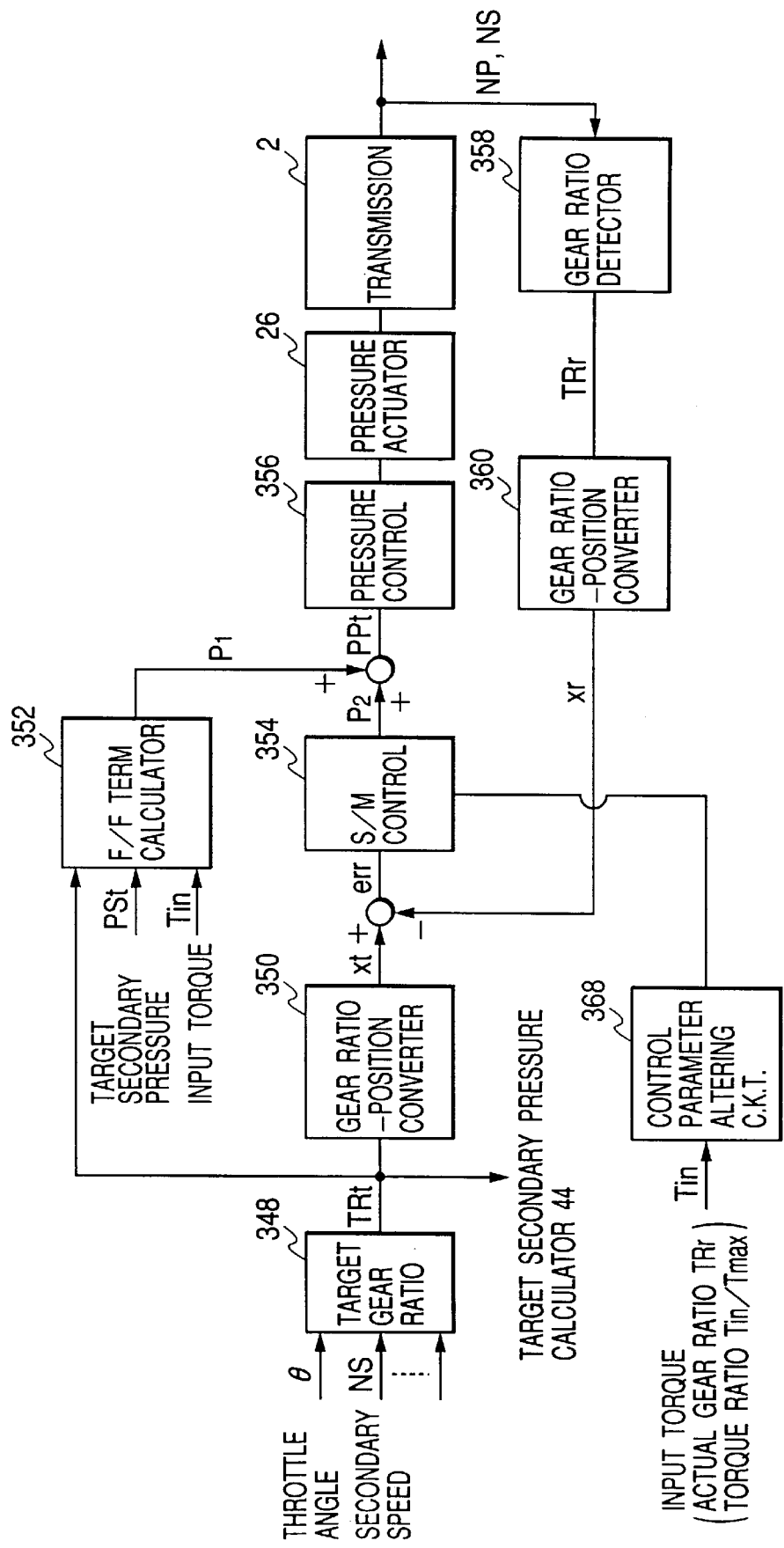
FIG. 21 shows a hydraulic control circuit for a primary pulley 10 according to the seventh embodiment of the invention.

FIG. 21 shows a hydraulic control circuit for the primary pulley 10 according to the seventh embodiment of the invention which is different from the one in FIG. 3 only in that a control parameter altering circuit 368 is further provided. Other circuit arrangements are identical, and explanation thereof in detail will be omitted here.

The control parameter altering circuit 368 alters the width d of the boundary layers across the switching circuit or the non-linear feedback term gain k used in the sliding mode control circuit 354 based on the input torque Tin estimated by the input torque estimating circuit 42.

Figure 22:
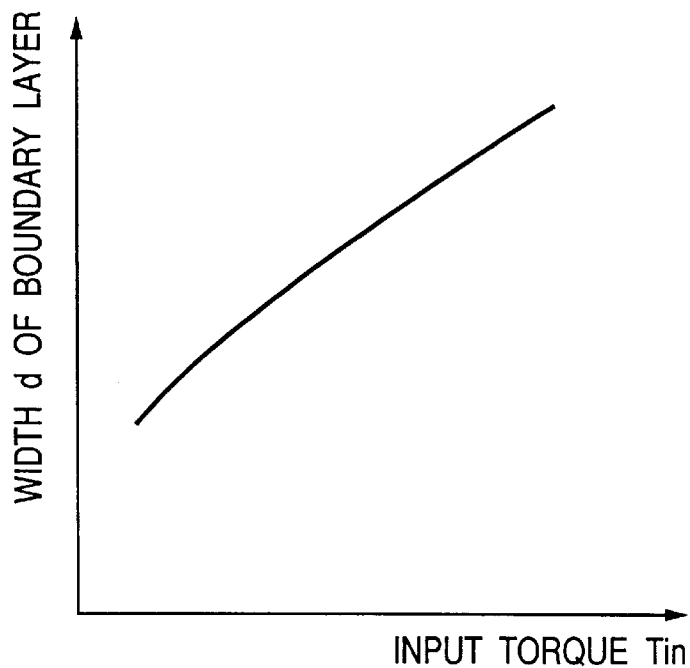
FIG. 22 is a graph which shows the width of a boundary layer determined based on an input torque Tin in the seventh embodiment.
Figure 23:
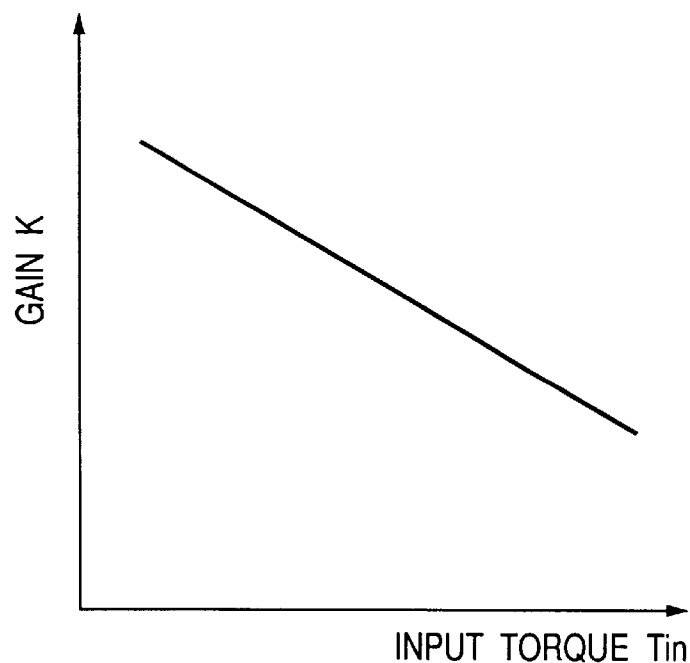
FIG. 23 is a graph which a gain of a non-linear feedback term determined based on an input torque Tin in the seventh embodiment.

Usually, the great input torque Tin will cause undershoot or overshoot to be increased, which results in an increase in degree of the hunting. The control parameter altering circuit 368, thus, minimizes the hunting by increasing the width d of each of the boundary layers, as shown in FIG. 22, or decreasing the non-linear feedback term gain k, as shown in FIG. 23, as the input torque Tin increases.

Figure 24:
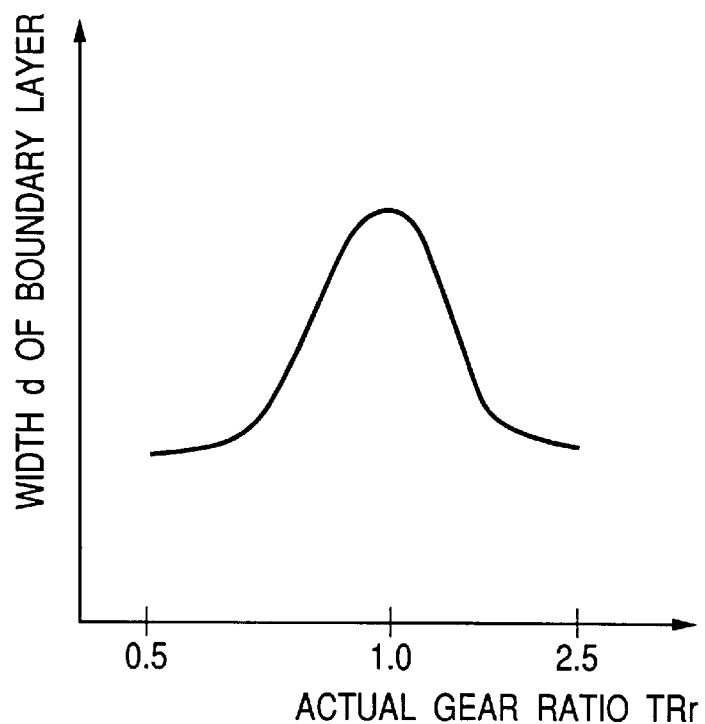
FIG. 24 is a graph which shows the width of a boundary layer determined based on an actual gear ratio TRr in the eighth embodiment.

The eighth embodiment will be discussed below which is different from the seventh embodiment in that the control parameter altering circuit 368 modifies the width d of the boundary layers, as shown in FIG. 24, with the extent of the actual gear ratio TRr determined by the actual gear ratio determining circuit 358 instead of using the input torque Tin. Other arrangements are identical, and explanation thereof in detail will be omitted here.

The map in FIG. 24 is produced based on the fact that the great gear ratio hunting is usually generated in a limited range of the gear ratio. Thus, when the actual gear ratio TRr falls within a specified hunting-causing gear ratio range across TRr=1.0, the control parameter altering circuit 368 increases the width d of the boundary layers, thereby allowing the actual gear ratio TRr to track the target gear ratio TRt quickly while minimizing the gear ratio hunting.

Figure 25:
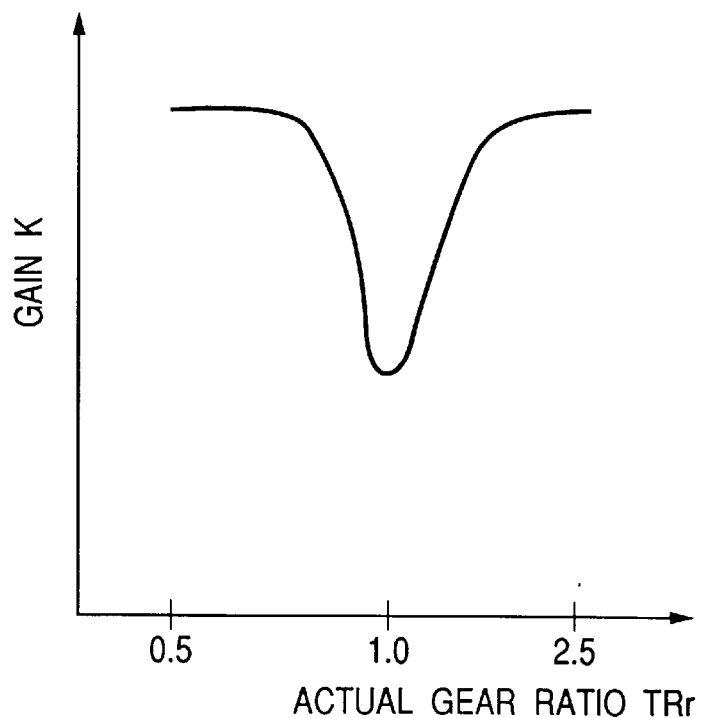
FIG. 25 is a graph which shows a gain of a non-linear feedback term determined based on an actual gear ratio TRr in the eighth embodiment.

Instead of modifying the width d of the boundary layers, the control parameter altering circuit 365 may change the non-linear feedback term gain k according to the actual gear ratio TRr. For instance, when the actual gear ratio TRr falls within a specified hunting-causing gear ratio range across TRr=1.0, as shown in FIG. 25, the non-linear feedback term gain k is decreased. This allows, similar to the above case, the actual gear ratio TRr to track the target gear ratio TRt quickly while minimizing the gear ratio hunting.

Figure 26:
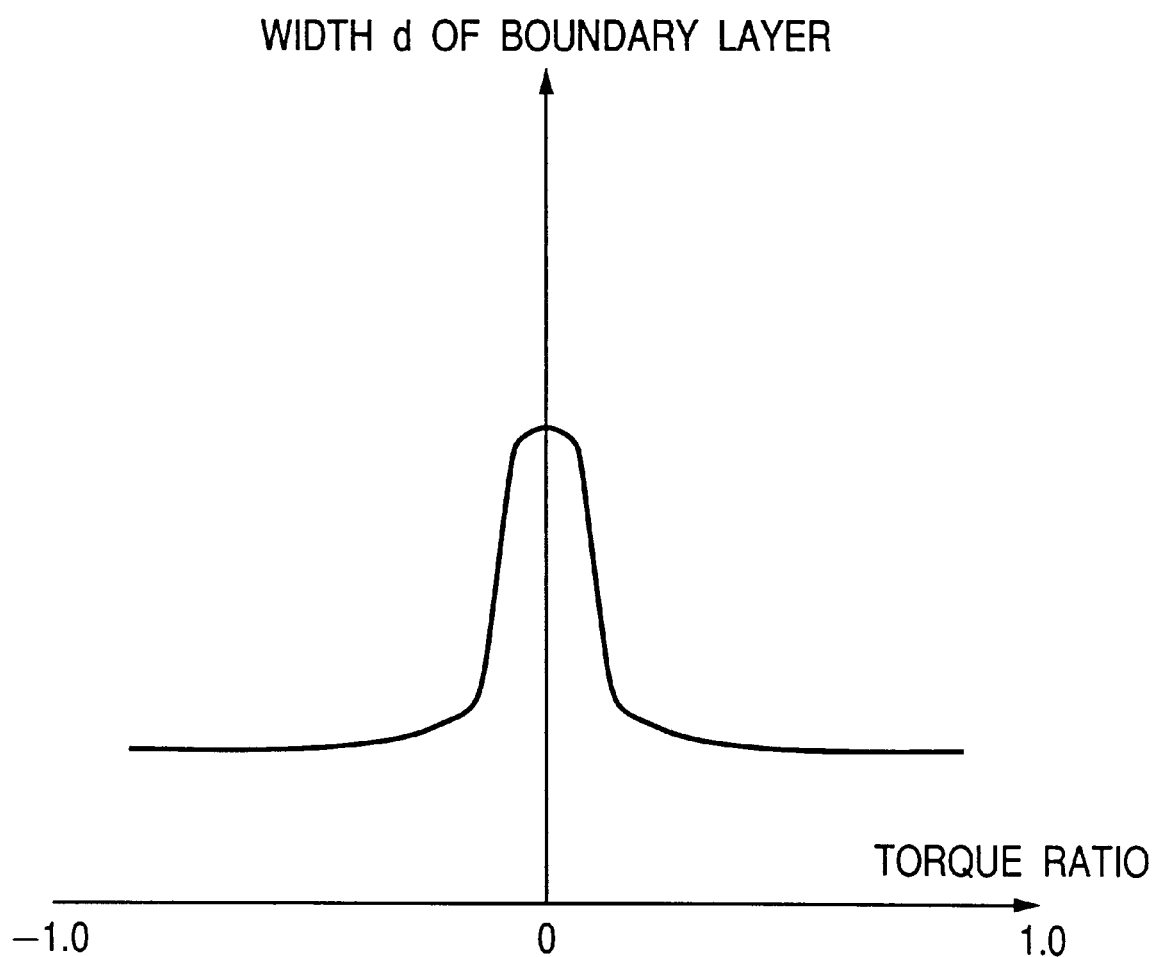
FIG. 26 is a graph which shows the width of a boundary layer determined based on a torque ratio Tin/Tmax in the ninth embodiment.

The ninth embodiment will be discussed below which is different from the seventh embodiment in that the control parameter altering circuit 368 modifies the width d of the boundary layers, as shown in FIG. 26, according to the torque ratio Tin/Tmax of the input torque Tin to the maximum torque Tmax calculated by the primary pressure feedforward term calculating circuit 52 instead of the input torque Tin. Other arrangements are identical, and explanation thereof in detail will be omitted here.

The map in FIG. 26 is produced based on the experimental fact that the great gear ratio hunting is generated in a limited range of the torque ratio Tin/Tmax. Thus, when the torque ratio Tin/Tmax falls within a specified hunting-causing torque ratio range across Tin/Tmax=0, the control parameter altering circuit 368 increases the width d of the boundary layers, thereby allowing the actual gear ratio TRr to track the target gear ratio TRt quickly while minimizing the gear ratio hunting.

Figure 27:
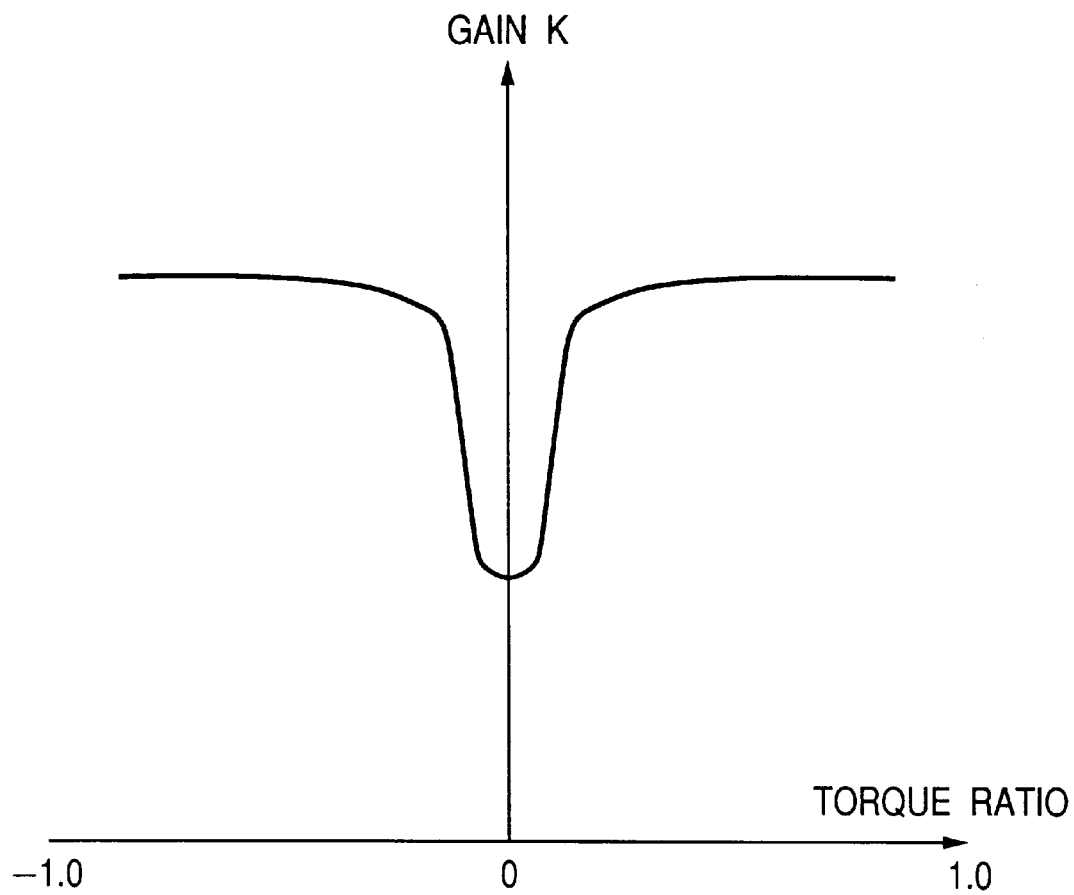
FIG. 27 is a graph which shows a gain of a non-linear feedback term determined based on a torque ratio Tin/Tmax in the ninth embodiment.

Instead of modifying the width d of the boundary layers, the control parameter altering circuit 365 may change the non-linear feedback term gain k according to the torque ratio Tin/Tmax. For instance, when the torque ratio Tin/Tmax falls within a specified hunting-causing torque ratio range across Tin/Tmax=1.0, as shown in FIG. 27, the non-linear feedback term gain k is decreased. This allows, similar to the above case, the actual gear ratio TRr to track the target gear ratio TRt quickly while minimizing the gear ratio hunting.

The tenth embodiment will be discussed below which is different from the first embodiment only in that the switching surface (s=0) in the sliding mode control is defined by the following expression instead of Eq. (4). Other arrangements are identical, and explanation thereof in detail will be omitted here.

$$s=G(ierr)+err \qquad (13)$$

where G(ierr) is a linear operator. Assuming that the state s of the controlled dynamic system in the phase space is controlled to be on the switching surface, the state variables ierr and err can be expressed by $$d(ierr)/dt=err \qquad (14)$$

$$\text{err} = -G(\text{ierr}) \quad (15)$$

Figure 28:
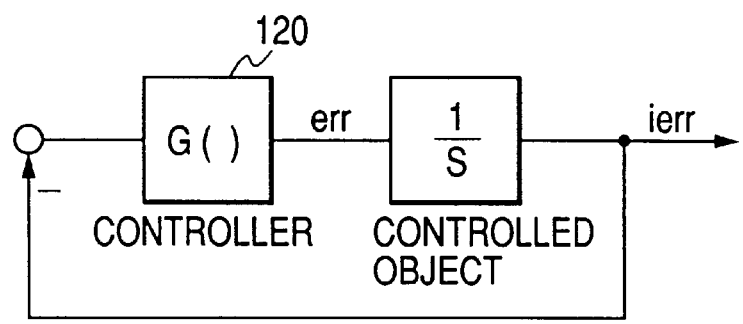
FIG. 28 is a block diagram which shows a circuit structure equivalent to a function G( ) used in the sliding mode control of the tenth embodiment.

The design of G( ) is equivalent to a control system, as shown in FIG. 28, which includes a controller 120 consisting of a phase lead-lag compensator designed to set the switching surface so as to advance the phase of the state s near gear ratio hunting frequencies according to the expression below.

$$G(q) = (1 + T1 \cdot q)/(1 + T2 \cdot q) \quad (16)$$

where q is the Laplace operator, and T1>T2.

Specifically, the reduction in hunting is achieved by defining the switching circuit (s=0) in the sliding mode control so as to show a phase lead-lag characteristic depending upon the actual hunting frequencies which develops the phase shift.

The eleventh embodiment will be discussed below.

The sliding mode control circuit 54 of the first embodiment calculates the primary pressure feedback term P2 on the assumption that Eq. (2) is satisfied, but in the case where it is impossible to ignore a lag between output of a primary hydraulic pressure control signal (i.e., the target primary pressure PPt) and an actual change in primary pressure, the primary pressure feedback term P2 may alternatively be determined based on the equations below.

$$d^2(\text{err})/dt^2 = C \cdot \text{err}' + D \cdot \text{err} + E \cdot P2 \quad (17)$$

where C, D, and E are coefficients depending upon the actual secondary pressure PS, the input torque Tin to the primary pulley 10, and the actual gear ratio TRr of the transmission 2.

The state s in the sliding mode control is defined as follows:

$$s = s11 \cdot \text{ierr} + s12 \cdot \text{err} + \text{err}' \quad (18)$$

where s11 and s12 are constants, respectively.

Using Eqs. (17) and (18), the primary pressure feedback term P2 is defined as $$P2 = (-1/E0) \cdot [(s11 + D0) \cdot \text{err} + (s12 + C0) \cdot \text{err}' - K12 \cdot \text{sat}(s)] \quad (19)$$

where C0, D0, and E0 are nominal values of the variables C, D, and E, sat(s) Is the same saturation function as shown in FIG. 8, and k12 is a non-linear feedback term gain (also called robustness parameter).

When C, D, and E are changed to show values different from C0, D0, and E0, respectively, the value of k12 must satisfy the following inequality in order to have the actual pulley position xr track the target pulley position xt.

$$k12 > \max(|dC \cdot \text{err}'|) + \max(|dD \cdot \text{err}|) + \max(|dE \cdot P2|) \quad (20)$$

where $dC = |C - C0|$, $dD = |D - D0|$, $dE = |E - E0|$, and max ( ) is a maximum value of an variable in parentheses.

Eq. (20) is derived in the following manner.

The primary pressure feedback term P2 and the actual pressure P2a are expressed by the following relation, taking a lag of change in the actual pressure P2a into account.

$$d(P2a)/dt = -(1/Tp) \cdot P2a + (1/Tp) \cdot P2 \quad (21)$$

where Tp is the time constant if P2→P2a is defined as first order lag.

The relation between the actual pressure P2a and the deviation err of the pulley position are expressed by $$d(\text{err})/dt = As \cdot \text{err} + Bs \cdot P2a \quad (22)$$

$$d^2(\text{err})/dt^2 = \quad (23)$$
$$-(1/Tp - As) \cdot d(\text{err})/dt + (As/Tp) \cdot \text{err} + (Bs/Tp) \cdot P2$$

If $C = -(1/Tp - As)$, $D = As/Tp$, and $D = Bs/Tp$, then Eq. (23) can be written as follows:

$$d^2(\text{err})/dt^2 = C \cdot \text{err}' + D \cdot \text{err} + E \cdot P2 \quad (24)$$

If $C = C0 + dC$, $D = D0 + dD$, and $E = E0 + dE$, Eq. (24) can then be rewritten as $$d^2(\text{err})/dt^2 = (C0 + dC) \cdot \text{err}' + (D0 + dD) \cdot \quad (25)$$
$$\text{err} + (E0 + dE) \cdot P2$$
$$= C0 \cdot \text{err}' + D0 \cdot \text{err} + E0 \cdot P2 +$$
$$dC \cdot \text{err}' + dD \cdot \text{err} + dE \cdot P2$$

Differentiating the state s in Eq. (18), we obtain $$s' = s11 \cdot \text{ierr} + s12 \cdot \text{err}' + \text{err}'' \quad (26)$$
$$= s11 \cdot \text{err} + s12 \cdot \text{err}' + C \cdot \text{err}' + D \cdot \text{err} + E \cdot P2$$
$$= (s11 + D) \cdot \text{err} + (s12 + C) \cdot \text{err}' + E \cdot P2$$
$$= (s11 + D0) \cdot \text{err} + (s12 + C0) \cdot \text{err}' + E0 \cdot P2 +$$
$$dC \cdot \text{err}' + dD \cdot \text{err} + dE \cdot P2$$

Substituting Eq. (19) into Eq. (26), we obtain $$s' = (s11 + D0) \cdot \text{err} + (s12 + C0) \cdot \text{err}' + E0 \cdot \quad (27)$$
$$(-1/E0) \cdot [(s11 + D0) \cdot \text{err} + (s12 + C0) \cdot \text{err}' -$$
$$k12 \cdot \text{sat2}(s)] + dC \cdot \text{err}' + dD \cdot \text{err} + dE \cdot P2$$
$$= -k12 \cdot \text{sat2}(s) + dC \cdot \text{err}' + dD \cdot \text{err} + dE \cdot P2$$

The sliding mode is development when s'·s<0, but Eq. (27) shows that the condition of Eq. (20) is adequate to develop the sliding mode.

The sliding mode control circuit 54 of the this embodiment determines the primary pressure feedback term P2 in the above described manner and adds it to the primary pressure feedforward term P1 determined by the primary pressure feedforward term determining circuit 52 to provide the target primary pressure PPt to the primary pressure controlling circuit 56. Other operations are identical with those in the first embodiment.

The primary pressure feedback term P2 thus determined may also be used with the second to eleventh embodiments.

Additionally, when the distance between the state s of the controlled dynamic system in the phase space and the switching surface is greater than a given value, the integral operation on the deviation err in Eq. (3), as already mentioned in the fourth embodiment, may be interrupted to hold the integral value derived so far. The use of this technique minimizes the overshoot of the state s.

The twelfth embodiment will be discussed below.

Figure 29:
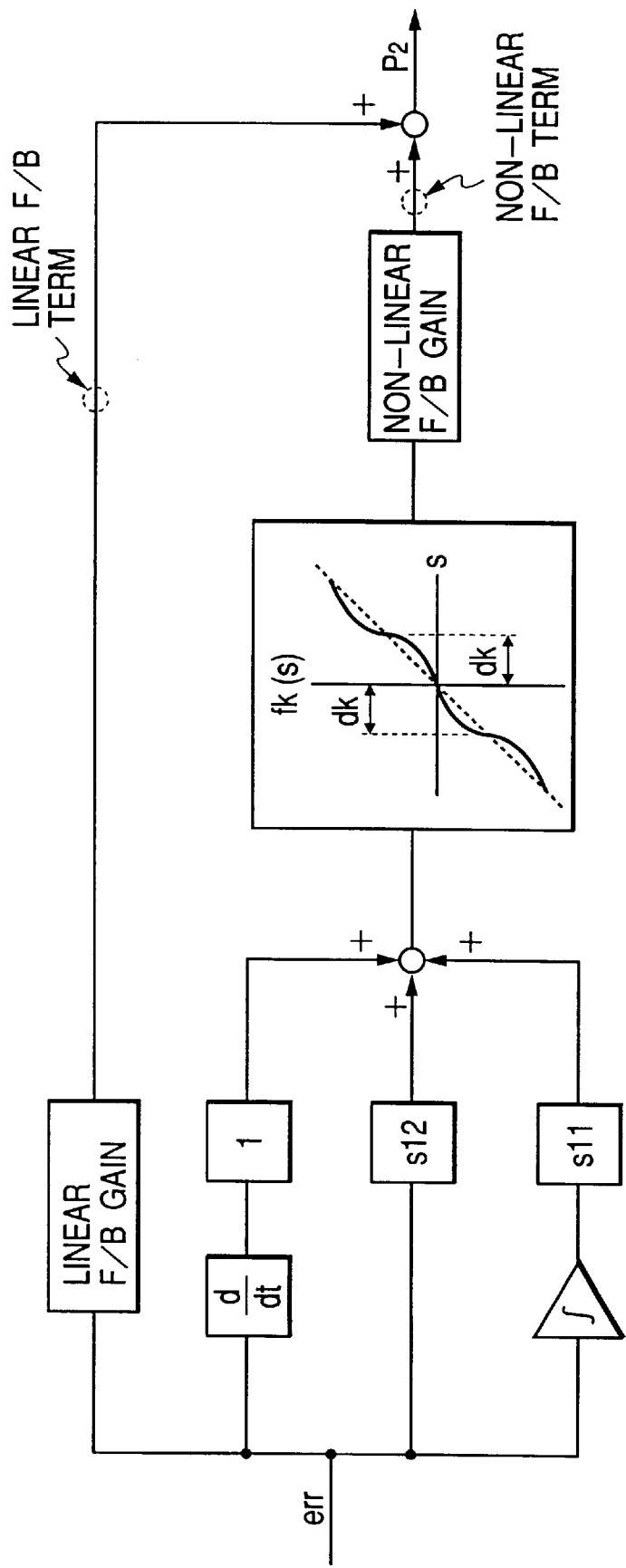
FIG. 29 is a block diagram which shows a circuit structure of a sliding mode control circuit 54 performing an operation on a non-linear feedback term in the eleventh embodiment.

The sliding mode control circuit 54 of the eleventh embodiment determines the state s using Eq. (18) and calculates the primary pressure feedback term P2 using Eq. (19). If, therefore, the third embodiment which employs the non-linear function f(s) shown in FIG. 12 instead of the saturation function sat(s) in Eq. (5) is used with the eleventh embodiment, the state s is then computed by adding integral term (s11·ierr), proportional (s12·err), and differential term (err') together, as shown in Eq. (18), and mapped to the single non-linear function f(s), as shown in FIG. 29. This avoids the hunting to a certain extent, but the sliding mode control circuit 54 of this embodiment uses an equation blow without summing up all the terms in Eq. 18.

$$(f(s11 \cdot ierr) + f(s12 \cdot err) + f(err')) \tag{28}$$

Figure 30:
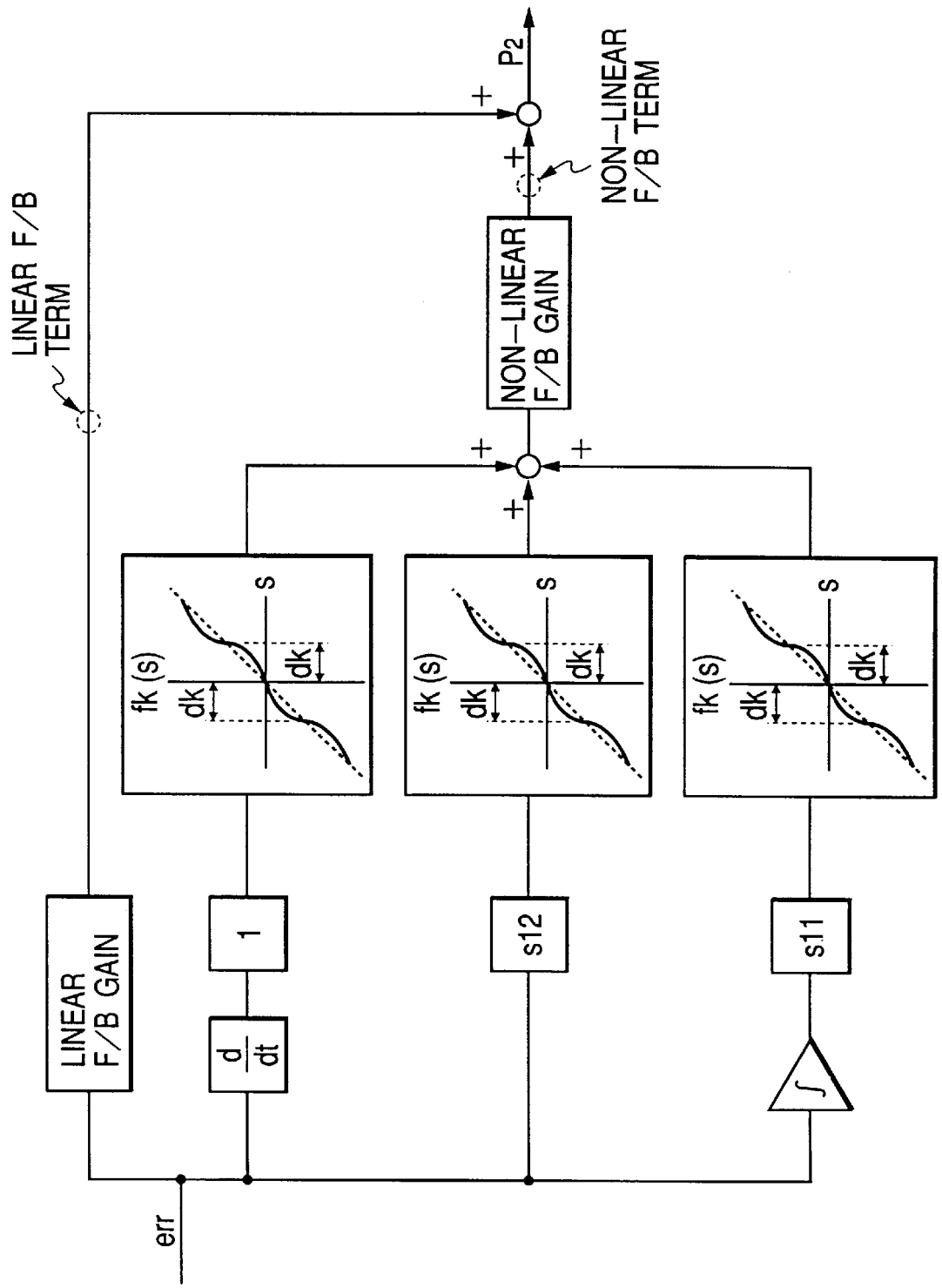
FIG. 30 is a block diagram which shows a circuit structure of a sliding mode control circuit 54 performing an operation on a non-linear feedback term in the twelfth embodiment.

Specifically, prior to summing up the integral term (s11·ierr), the proportional (s12·err), and the differential term (err'), these terms are, as shown in FIG. 30, mapped into the non-linear functions f(s), respectively, which are identical with each other, and then added together. The resulting value is used in Eq. (19) instead of sat(s).

Figure 31:
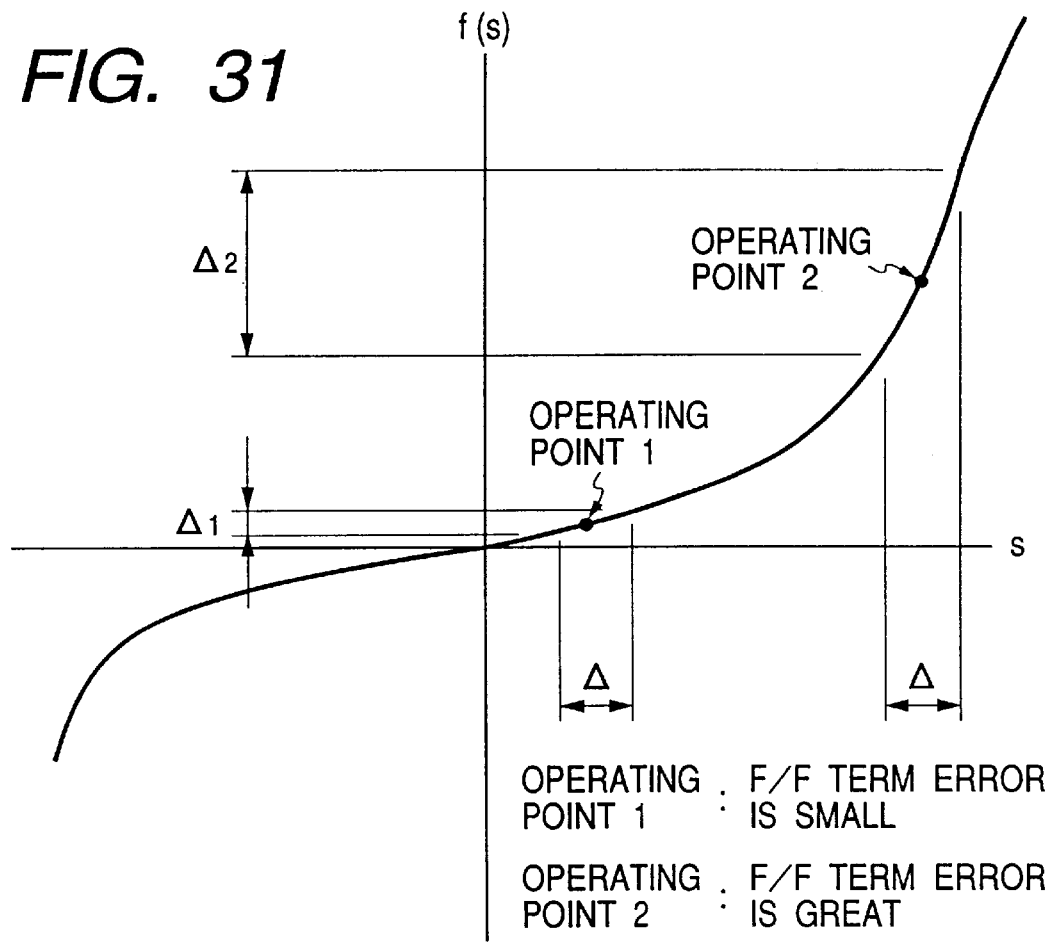
FIG. 31 is a graph which shows the slope of a non-linear function f(s) in terms of the distance between the state s and the switching surface (s=0) in the twelfth embodiment.

The function f(s), as indicated by the solid line in FIG. 12, is a non-linear function that produces a variable smaller in absolute value in the boundary layers of the phase space of the controlled system than a variable (i.e., the value of the saturation function sat(s)) proportional to the distance between the state s and the switching surface (s=0). In order to have the non-linear function f(s) exhibit such a characteristic, a curve thereof, as shown in FIG. 31, is defined to have an slope that is decreased within the boundary layers as reaching the switching surface (s=0). This yields the effects of making the state s approach the switching surface more quickly as the distance between the state and the switching surface becomes great and decreasing the speed of movement of the state s as approaching the switching surface to avoid the hunting.

Figure 32:
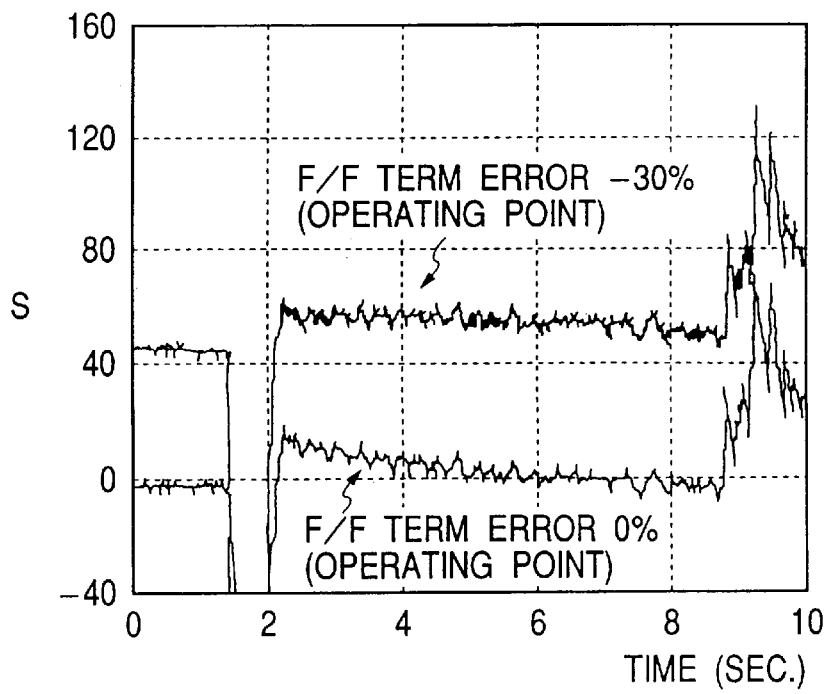
FIG. 32 is a graph which shows behavior of the state s caused by an error of a primary feedforward term P1 when a vehicle is fully accelerated.

If, however, a relative great error Δ arises for some reason in the output of the primary pressure feedforward term calculating circuit 52, so that the integral term (s11·ierr) is increased in Eq. (18), then the state s is derived as being, as can be seen in FIG. 32, away from the switching surface (s=0). Therefore, performing an operation on the non-linear function f(s) where the slope of the curve, as shown in FIG. 31, becomes great causes an error Δ2 produced by resultant values of the proportional (s12·err) and the differential term (err') to be increased, which would cause the primary pressure feedback term P2 to undergo the hunting.

The sliding mode control circuit 54 of this embodiment, however, maps the terms in Eq. (18) into their respective functions f(s), so that the value of the integral term (s11·ierr) does not impinge on the mapping of the proportional (s12·err) and the differential term (err'), which keeps an error in each function f(s) small, as illustrated by Δ1 in FIG. 31. This further minimizes the hunting.

Modifications of the first to twelfth embodiments are described below.

Each of the above embodiments, as for example, the first embodiment converts the gear ratios TRt and TRr into the pulley positions xt and xr through the gear ratio-pulley position converting circuits 50 and 60 and has the actual pulley position xr track the target pulley position xt through the sliding mode control circuit 54, but gear ratio-primary speed converting circuits designed to translate the gear ratios TRt and TRr into the target primary speed NPt and the actual primary speed NPr which are used in the sliding mode control circuit 54 instead of the actual and target pulley positions xr and xt may alternatively be used.

Figure 33:
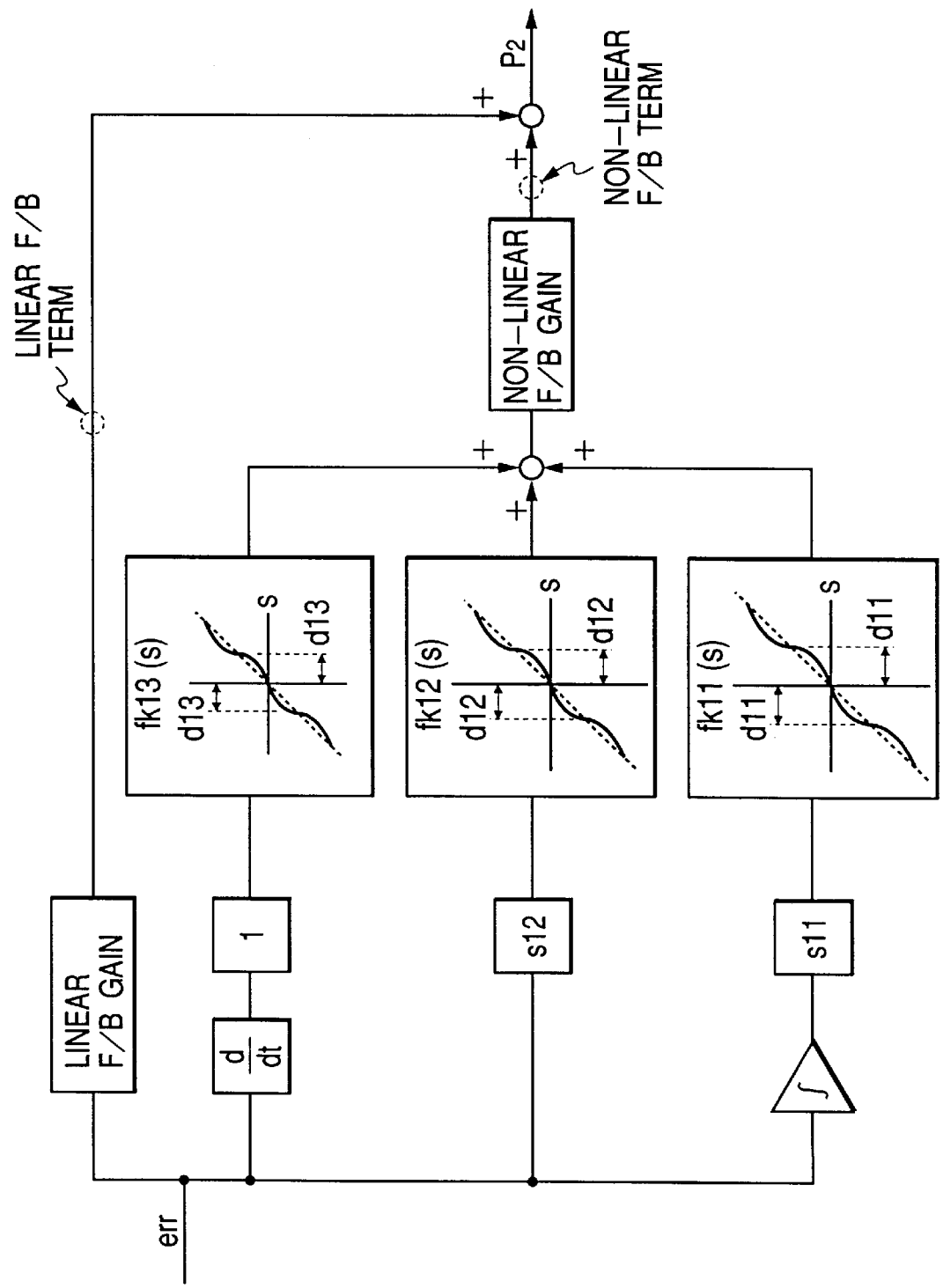
FIG. 33 is a block diagram which shows a circuit structure of a sliding mode control circuit 54 performing an operation on a non-linear feedback term in a modification of the twelfth embodiment.

In the twelfth embodiment, the sliding mode control circuit 54 maps each of the integral term (s11·ierr), the proportional (s12·err), and the differential term (err') into the same non-linear function f(s), but different non-linear functions f11(s), f12(s), and f13(s), as shown below and in FIG. 33, may alternatively be used.

$$(f11(s11 \cdot ierr) + f12(s12 \cdot err) + f13(err')) \tag{29}$$

In this case, the convergence of the state s is further enhanced by lowering a gain of f11( ) into which the integral term is mapped (i.e., the slope of the non-linear function f(s) in FIG. 12) as compared with those of other terms f12( ) and f13( ).

Further, in the twelfth embodiment, the sliding mode control circuit 54 may employ a function below instead of Eq. (29).

$$(f(s11 \cdot ierr) + f(s12 \cdot err + err')) \tag{30}$$

Specifically, the sliding mode control circuit 54 divides the right side of Eq. (18) into the integral term (s11·ierr) and a combination of the proportional (s12·err) and the differential term (err') and maps them into the similar non-linear functions f(s), respectively.

Alternatively, the sliding mode control circuit 54 may use a function below.

$$(f21(s11 \cdot ierr) + f22(s12 \cdot err + err')) \tag{31}$$

Specifically, the integral term (s11·ierr) and the combination of the proportional (s12·err) and the differential term (err') are mapped into different non-linear functions f21( ) and f22( ), and the values thereof are summed up.

Figure 34:
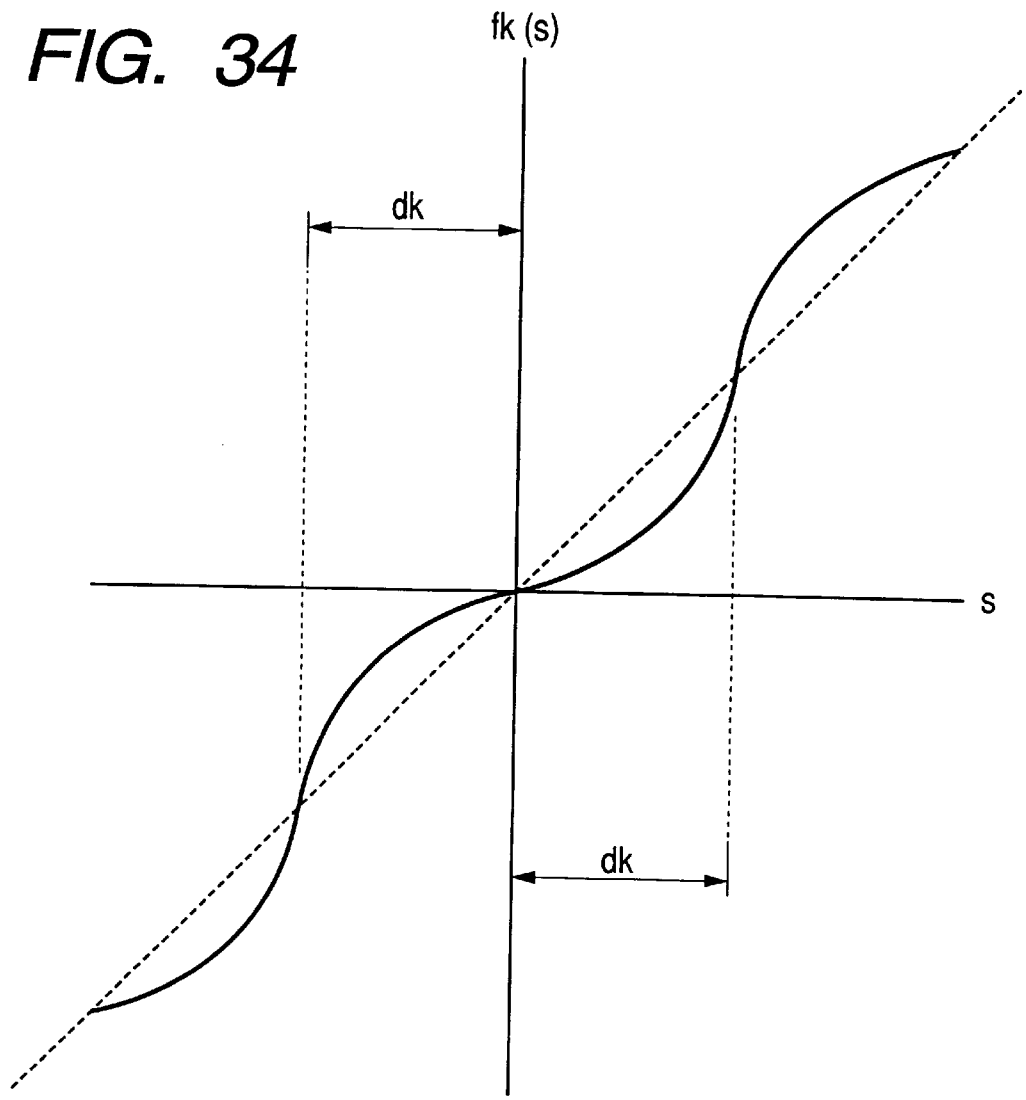
FIG. 34 is a graph which shows one example of non-linear functions f11(s), f12(s), and f13(s) used in a modification of the twelfth embodiment.

One example of the non-linear functions f11(s), f12(s), and f13(s) is shown in FIG. 34. In the drawing, the boundary layers are defined in an area where the value of fk(s) where k=11, 12, or 13 is smaller than the state s and have the width dk.

The width dk of the boundary layers may be adjusted. For instance, it is advisable that the widths d12 and d13 be changed based on one or more of the input torque Tin, the actual gear ratio TRr, and the torque ratio Tin/Tmax, while the width d11 be fixed. This yields both the quick-convergence of the state s and low-hunting.

Figure 35:
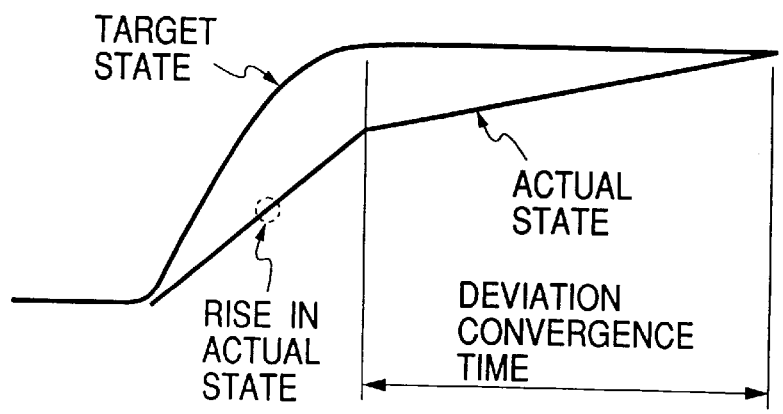
FIG. 35 is a graph which shows a deviation convergence time required for an actual state to converge on a target state used in determining the width of a boundary in a phase space of a controlled system in a modification of the twelfth embodiment.

As an alternative to the width adjustment as described above, the width d11 may be determined by adjusting a deviation convergence time, as shown in FIG. 35, required for the actual state to converge on the target state to a preselected value, while the widths d12 and d13 may be determined by adjusting the rate of rise in actual state to a preselected value. This keeps the steady-state deviation at zero (0) and provides the quick response rate.

In the seventh to ninth embodiments, the control parameter altering circuit 368 changes the boundary layer width d or the gain k of the non-linear feedback term used in the sliding mode control circuit 354 based on the input torque Tin, the actual gear ratio TRr, or the torque ratio Tin/Tmax, but may alternatively determine it by look-up using a two- or three-dimensional map whose variables of function are any two or all of the input torque Tin, the actual gear ratio TRr, and the torque ratio Tin/Tmax. The three-dimensional map used in determining the boundary layer width d or the gain k based on all the input torque Tin, the actual gear ratio TRr, and the torque ratio Tin/Tmax is preferable to the two-dimensional map. The use of the two-dimensional map whose variables of function are the actual gear ratio TRr and one of the input torque Tin and the torque ratio Tin/Tmax, however, offers the advantage that both torque and gear ratio components reflect the determination of the boundary layer width d.

It the design of such maps, it is advisable that the boundary layer width d be increased or the gain k of the non-linear feedback term be decreased when the input torque Tin is high, the actual gear ratio TRr is approximately 1 to 1.2, or the torque ratio Tin/Tmax is near zero (0).

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus for controlling a dynamic system under feedforward and sliding mode control comprising:

a state determining circuit that determines an actual state of the controlled system;

a target state determining circuit that determines a target state of the controlled system based on the actual state determined by said state determining circuit;

a feedforward-controlled variable determining circuit that determines a variable controlled by the feedforward control based on the target state determined by said target state determining circuit;

a sliding mode-controlled variable determining circuit that determines a variable controlled by the sliding mode control based on a state deviation between the actual state and the target state determined by said state determining circuit and the target state determining circuit; and a state controlling circuit that determines a manipulated variable based on the sum of said feedforward-controlled variable and said sliding mode-controlled variable to bring the actual state of the controlled system into agreement with the target state.

2. An apparatus as set forth in claim 1, further comprising a filter that removes a frequency component causing vibrations of the actual state of the controlled system from the state deviation between the actual state and the target state determined by said state determining circuit and the target state determining circuit.

3. An apparatus as set forth in claim 2, further comprising a second filter that removes a frequency component causing vibrations of the actual state of the controlled system from the manipulated variable provided by said state controlling circuit.

4. An apparatus as set forth in claim 1, wherein said sliding mode-controlled variable determining circuit determines the sliding mode-controlled variable based on a value of a given function of the state deviation which has a non-linear feedback term whose value is derived based on a value to which a state of the controlled system defined within a phase space of the sliding mode control is mapped through a non-linear feedback function f(s) and which is at least smaller in absolute value than a value derived in proportion to a distance between the state of the controlled system and a switching surface in the phase space within boundary layers across the switching surface.

5. An apparatus as set forth in claim 4, wherein the state of the controlled system is defined, in relation to the state deviation, as $$s = k1 \cdot \text{errs}' + k2 \cdot \text{err} + k3 \cdot \text{ierr} \tag{a}$$

where s is the sate of the controlled system, k1, k2, and k3 are zero (0) or finite real numbers, err is the state deviation, err' is a differential of err, and ierr is an integral of err.

6. An apparatus as set forth in claim 5, wherein when the distance between the state of the controlled system and the switching surface is greater than a given value, said sliding mode-controlled variable determining circuit interrupts an integral operation on the state deviation err in Eq. (a) and holds an integral value of the state deviation err determined so far.

7. An apparatus as set forth in claim 5 wherein the non-linear feedback term is defined by a product of the value mapped by the non-linear function f(s) and a non-linear feedback gain.

8. An apparatus as set forth in claim 5, wherein the non-linear feedback term is defined by a product of a non-linear feedback gain and the sum of a first value and a second value, the first value being a value to which an integral term (k3·ierr) in Eq. (a) is mapped through a non-linear feedback function, the second value being one of a value to which an differential term (k1·errs') and a proportional (k2·err) in Eq. (a) are mapped through a first function and the sum of values to which the differential term (k1·errs') and the proportional (k2·err) are mapped through different functions.

9. An apparatus as set forth in claim 5, wherein the non-linear feedback term is defined by a product of a non-linear feedback gain and the sum of a first value to which an differential term (k1·errs') in Eq. (a) is mapped through a first function, a second value to which a proportional (k2·err) is mapped through a second function, and a third value to which an integral term (k3·ierr) is mapped through a third function.

10. An apparatus as set forth in claim 9, wherein the first, second, and third functions are identical with each other.

11. An apparatus as set forth in claim 9, wherein the first, second, and third functions are different from each other.

12. An apparatus as set forth in claim 4, wherein a width of one of the boundary layers within an area where the state of the controlled system lies in the phase space is greater than that of the other boundary layer.

13. An apparatus as set forth in claim 4, further comprising a hunting determining circuit that determines whether the actual state of the controlled system is undergoing hunting or not, and wherein when said hunting determining circuit determines that the actual state is undergoing the hunting, said sliding mode-controlled variable determining circuit increases a width of each of the boundary layers in the phase space of the controlled system.

14. An apparatus as set forth in claim 4, further comprising a hunting determining circuit that determines whether the actual state of the controlled system is undergoing hunting or not, and wherein said sliding mode-controlled variable determining circuit provides a smaller gain to the non-linear feedback term when said hunting determining circuit determines that the actual state is undergoing the hunting, while provides a greater gain thereto when said hunting determining circuit determines that the actual state is not undergoing the hunting.

15. An apparatus as set forth in claim 1, wherein said sliding mode-controlled variable determining circuit defines a switching surface in a phase space of the controlled system under the sliding mode control so as to show a phase lead-lag characteristic corresponding to a hunting frequency of the actual state of the controlled system determined by the state determining circuit.

16. An apparatus as set forth in claim 1, wherein the controlled system is a continuously variable transmission for an automotive vehicle, and wherein the target state determined by said target state determining circuit is a target gear ratio of the continuously variable transmission.

17. An apparatus as set forth in claim 16, wherein the continuously variable transmission is of a belt-type which includes a first pulley and a second pulley around which a belt is wound, the first pulley including a movable member and a stationary member opposed to the movable member through a groove with which the belt moves in engagement, the continuously variable transmission changing a gear ratio by changing a position of the movable member relative to the stationary member of the first pulley.

18. An apparatus as set forth in claim 17, further comprising:

a gear ratio-pulley position converting circuit that converts the target gear ratio of the continuously variable transmission into a target position of the movable member of the first pulley; and an actual pulley position determining circuit that determines an actual position of the movable member of the first pulley, and wherein said feedforward-controlled variable determining circuit determines the feedforward-controlled variable based on the target gear ratio and input torque of the continuously variable transmission, and said sliding mode-controlled variable determining circuit determines the sliding mode-controlled variable based on the state deviation between the target position of the movable member of the first pulley and the actual position of the movable member of the first pulley.

19. An apparatus as set forth in claim 18, wherein said actual pulley position determining circuit determines an actual gear ratio based on the actual state determined by said state determining circuit and converts the actual gear ratio into the actual pulley position of the movable member of the first pulley.

20. An apparatus as set forth in claim 17, further comprising:

a gear ratio-target speed converting circuit that converts the target gear ratio of the continuously variable transmission into a target speed of the movable member of the first pulley; and an actual pulley position determining circuit that determines an actual position of the movable member of the first pulley, and wherein said feedforward-controlled variable determining circuit determines the feedforward-controlled variable based on the target gear ratio and input torque of the continuously variable transmission, and said sliding mode-controlled variable determining circuit determines the sliding mode-controlled variable based on the state deviation between the target speed of the movable member of the first pulley and the actual position of the movable member of the first pulley.

21. An apparatus as set forth in claim 17, further comprising:

an input torque estimating circuit that estimates an input torque of the continuously variable transmission;

a second pulley torque determining circuit that determines a target manipulated variable based on the input torque estimated by said input torque estimating circuit and the target gear ratio determined by said target state determining circuit to control a belt-holding force of the second pulley based on the target manipulated variable without any slippage of the belt on the second pulley;

a gear ratio-pulley position converting circuit that converts the target gear ratio of the continuously variable transmission into a target position of the movable member of the first pulley; and an actual pulley position determining circuit that determines an actual position of the movable member of the first pulley based on the actual state determined by said state determining circuit, and wherein said feedforward-controlled variable determining circuit determines the feedforward-controlled variable based on the target gear ratio determined by said target sate determining circuit, the input torque estimated by said input torque, and the target manipulated variable determined by said second pulley torque determining circuit, and wherein said sliding mode-controlled variable determining circuit determines the sliding mode-controlled variable based on the state deviation between the target position of the movable member of the first pulley and the actual position of the movable member of the first pulley, and wherein said state controlling circuit that determines the manipulated variable based on the sum of said feedforward-controlled variable and said sliding mode-controlled variable to control the actual position of the movable member of the first pulley.

22. An apparatus as set forth in claim 21, wherein said actual pulley position determining circuit determines an actual gear ratio based on the actual state determined by said state determining circuit and converts the actual gear ratio into the actual pulley position of the movable member of the first pulley.

23. An apparatus as set forth in claim 21, wherein said sliding mode-controlled variable determining circuit determines the sliding mode-controlled variable P2 according to an equation (a) below $$P2=(-1/B0)\cdot((s1+A0)\cdot err + k\cdot sat(s)) \qquad (a)$$

where s1 is a constant, sat(s) is a saturation function, s is defined by an equation (b) below, k is a gain satisfying a condition of an equation (c), and err is the state deviation between the target position and the actual position of the movable member of the first pulley and defined as in an equation (d) below $$s = s1\cdot ierr + err \qquad (b)$$

$$k > \max(|dA\cdot err|) + \max(|dB\cdot P2|) \qquad (c)$$

$$d(err)/dt = A\cdot err + B\cdot P2 \qquad (d)$$

where ierr is defined as in an equation (e) below, A and B are values depending upon the belt-holding force of the second pulley, the input torque, and an actual gear ratio, $dA=|A-A0|$, $dB=|B-B0|$, A0 and B0 are nominal values of A and B $$ierr = \int err\cdot dt \qquad (e)$$

24. An apparatus as set forth in claim 21, wherein said sliding mode-controlled variable determining circuit determines the sliding mode-controlled variable P2 according to an equation (a) below $$P2 = (-1/E0)\cdot[(s11+D0)\cdot err + (s12+C0)\cdot err' - k12\cdot sat(s)] \qquad (a)$$

where s11 and s12 are constant, sat(s) is a saturation function, s is defined by an equation (b) below, k12 is a gain satisfying a condition of an equation (c) below, err is the state deviation between the target position and the actual position of the movable member of the first pulley and defines as in an equation (d) below, and err' is an integral of err $$s = s11 \cdot ierr + s12 \cdot err + err' \quad (b)$$

$$k12 > \max(|dC \cdot err'|) + \max(|dD \cdot err|) + \max(|dE \cdot P2|) \quad (c)$$

$$d^2(err)/dt^2 = C \cdot err' + D \cdot err + E \cdot P2 \quad (d)$$

where C, D, and E are values depending upon the belt-holding force of the second pulley, the input torque, and a actual gear ratio, dC=|C−C0|, dD=|D−D0|, dE=|E−E0|, C0, D0, and E0 are nominal values of C, D, and E, and max ( ) is an indicates a maximum value of an variable in parentheses.

25. An apparatus as set forth in claim 16, wherein said sliding mode-controlled variable determining circuit determines the sliding mode-controlled variable based on a value of a given function of the state deviation which has a non-linear feedback term whose value is derived based on a value to which a state of the controlled system defined within a phase space of the sliding mode control is mapped through a non-linear feedback function f(s) and which is at least smaller in absolute value than a value derived in proportion to a distance between the state of the controlled system and a switching surface in the phase space within boundary layers across the switching surface.

26. An apparatus as set forth in claim 25, wherein said sliding mode-controlled variable determining circuit increases a width of each of the boundary layers as an input torque of the continuously variable transmission is increased.

27. An apparatus as set forth in claim 25, wherein said sliding mode-controlled variable determining circuit decreases a gain provided to the non-linear feedback term as an input torque of the continuously variable transmission is increased.

28. An apparatus as set forth in claim 25, wherein said sliding mode-controlled variable determining circuit changes a width of each of the boundary layers based on an actual gear ratio a state determined by said state determining circuit as the actual sate of the controlled system.

29. An apparatus as set forth in claim 25, wherein said sliding mode-controlled variable determining circuit changes a gain in the non-linear feedback term based on an actual gear ratio a state determined by said state determining circuit as the actual sate of the controlled system.

30. An apparatus as set forth in claim 25, wherein said sliding mode-controlled variable determining circuit changes a width of each of the boundary layers based on a torque ratio of an input torque of the continuously variable transmission to a maximum torque allowing the belt to transmit the input torque between the first pulley and the second pulley without any slippage.

31. An apparatus as set forth in claim 25, wherein said sliding mode-controlled variable determining circuit changes a gain in the non-linear feedback term based on a torque ratio of an input torque of the continuously variable transmission to a maximum torque allowing the belt to transmit the input torque between the first pulley and the second pulley without any slippage.

32. An apparatus as set forth in claim 25, wherein said sliding mode-controlled variable determining circuit changes a width of each of the boundary layers based on at least two of an input torque of the continuously variable transmission, an actual gear ratio of the continuously variable transmission, and a torque ratio of the input torque to a maximum torque allowing the belt to transmit the input torque between the first pulley and the second pulley without any slippage.

33. An apparatus as set forth in claim 25, wherein said sliding mode-controlled variable determining circuit changes a gain in the non-linear feedback term based on at least two of an input torque of the continuously variable transmission, an actual gear ratio of the continuously variable transmission, and a torque ratio of the input torque to a maximum torque allowing the belt to transmit the input torque between the first pulley and the second pulley without any slippage.

* * * * *